(12) United States Patent
Lockett et al.

(10) Patent No.: US 10,329,444 B2
(45) Date of Patent: **\*Jun. 25, 2019**

(54) NICKEL INKS AND OXIDATION RESISTANT AND CONDUCTIVE COATINGS

(71) Applicant: Printed Energy Pty Ltd, Brisbane (AU)

(72) Inventors: Vera N. Lockett, Phoenix, AZ (US); Alexandra E. Hartman, Tolleson, AZ (US); John G. Gustafson, Tempe, AZ (US); Mark D. Lowenthal, Gilbert, AZ (US); William J. Ray, Fountain Hills, AZ (US)

(73) Assignee: Printed Energy Pty Ltd, Queensland (AU)

( \* ) Notice: Subject to any disclaimer, the term of this patent is extended or adjusted under 35 U.S.C. 154(b) by 150 days.

This patent is subject to a terminal disclaimer.

(21) Appl. No.: 14/141,929

(22) Filed: Dec. 27, 2013

(65) Prior Publication Data

US 2014/0183421 A1    Jul. 3, 2014

Related U.S. Application Data

(60) Provisional application No. 61/747,093, filed on Dec. 28, 2012.

(51) Int. Cl.
*H01B 1/02*  (2006.01)
*C09D 11/52* (2014.01)
(Continued)

(52) U.S. Cl.
CPC ............... *C09D 11/52* (2013.01); *C08K 3/04* (2013.01); *C08K 3/08* (2013.01); *C08K 5/053* (2013.01);
(Continued)

(58) Field of Classification Search
CPC ....................................................... H01B 1/02
(Continued)

(56) References Cited

U.S. PATENT DOCUMENTS

| 4,108,841 A | * 8/1978 | Habermeier | C08G 63/6856 528/279 |
| 4,371,459 A | 2/1983 | Nazarenko | |

(Continued)

FOREIGN PATENT DOCUMENTS

| CN | 101792627 | 8/2010 |
| CN | 101805538 | 8/2010 |

(Continued)

OTHER PUBLICATIONS

International Search Report and Written Opinion in PCT Application No. PCT/US2013/078059, dated Apr. 22, 2014, in 8 pages.

*Primary Examiner* — William D Young
(74) *Attorney, Agent, or Firm* — Knobbe, Martens, Olson & Bear, LLP

(57) ABSTRACT

A conductive ink may include a nickel component, a polycarboxylic acid component, and a polyol component, the polycarboxylic acid component and the polyol component being reactable to form a polyester component. The polyester component may be formed in situ in the conductive ink from a polyol component and a polycarboxylic acid component. The conductive ink may include a carbon component. The conductive ink may include an additive component. The conductive ink may include nickel flakes, graphene flakes, glutaric acid, and ethylene glycol. The conductive ink may be printed (e.g., screen printed) on a substrate and cured to form a conductive film. A conductive film may include a nickel component and a polyester component.

19 Claims, 1 Drawing Sheet

(51) Int. Cl.
*C08K 3/08* (2006.01)
*C08K 3/04* (2006.01)
*C08K 5/092* (2006.01)
*C08K 5/053* (2006.01)
*C09D 11/037* (2014.01)
*C09D 11/104* (2014.01)
*C09D 11/03* (2014.01)
*C09D 11/30* (2014.01)

(52) U.S. Cl.
CPC .............. *C08K 5/092* (2013.01); *C09D 11/03* (2013.01); *C09D 11/037* (2013.01); *C09D 11/104* (2013.01); *C09D 11/30* (2013.01); *C08K 3/041* (2017.05); *C08K 3/042* (2017.05); *C08K 3/046* (2017.05); *C08K 2003/0862* (2013.01); *H01B 1/02* (2013.01)

(58) Field of Classification Search
USPC ........................................................ 252/512
See application file for complete search history.

(56) References Cited

U.S. PATENT DOCUMENTS

| | | | |
|---|---|---|---|
| 4,406,826 A * | 9/1983 | Morgan | C08G 75/045 252/502 |
| 5,294,609 A * | 3/1994 | Arisawa | C07D 291/08 435/253.5 |
| 6,398,861 B1 | 6/2002 | Knox | |
| 6,440,331 B1 | 8/2002 | Carano et al. | |
| 6,576,336 B1 | 6/2003 | LeGrande | |
| 7,189,341 B2 | 3/2007 | Li et al. | |
| 7,655,161 B2 | 2/2010 | Cho et al. | |
| 7,938,901 B2 | 5/2011 | Wheeler et al. | |
| 7,968,011 B2 | 6/2011 | Overbeek et al. | |
| 9,416,290 B2 | 8/2016 | Lockett et al. | |
| 9,815,998 B2 | 11/2017 | Lockett et al. | |
| 9,825,305 B2 | 11/2017 | Lockett et al. | |
| 9,834,447 B2 | 12/2017 | Lockett et al. | |
| 2003/0151030 A1 | 8/2003 | Gurin | |
| 2004/0178391 A1 | 9/2004 | Conaghan et al. | |
| 2005/0247916 A1 * | 11/2005 | McCormick | B82Y 30/00 252/500 |
| 2007/0237669 A1 | 10/2007 | Lee | |
| 2007/0261596 A1 | 11/2007 | Fechner et al. | |
| 2008/0134936 A1 | 6/2008 | Kamikoriyama et al. | |
| 2009/0035472 A1 | 2/2009 | Otsuka et al. | |
| 2009/0053525 A1 | 2/2009 | Kamikoriyama et al. | |
| 2009/0252924 A1 | 10/2009 | Kamikoriyama et al. | |
| 2009/0258202 A1 | 10/2009 | Sakaguchi et al. | |
| 2009/0293766 A1 | 12/2009 | Kamikoriyama et al. | |
| 2010/0284123 A1 | 11/2010 | Pulugurtha et al. | |
| 2011/0065228 A1 * | 3/2011 | Li | H01L 21/02568 438/94 |
| 2012/0100402 A1 | 4/2012 | Nesper et al. | |
| 2012/0111599 A1 | 5/2012 | Roberson et al. | |
| 2012/0142832 A1 * | 6/2012 | Varma | C08L 77/00 524/145 |
| 2012/0187906 A1 | 7/2012 | Martienssen et al. | |
| 2012/0250225 A1 | 10/2012 | Aria et al. | |
| 2013/0153835 A1 * | 6/2013 | Hinotsu | H01B 1/22 252/514 |
| 2013/0265735 A1 * | 10/2013 | Nakatani | H01B 1/22 361/783 |
| 2014/0029161 A1 | 1/2014 | Beidaghi et al. | |
| 2014/0099528 A1 | 4/2014 | Lockett et al. | |
| 2014/0183421 A1 | 7/2014 | Lockett et al. | |
| 2014/0329067 A1 * | 11/2014 | Andre | H01B 1/22 428/209 |
| 2015/0299481 A1 | 10/2015 | Lockett et al. | |
| 2015/0338403 A1 | 11/2015 | Wang | |
| 2015/0353753 A1 | 12/2015 | Lockett et al. | |
| 2018/0069246 A1 | 3/2018 | Lockett et al. | |

FOREIGN PATENT DOCUMENTS

| | | |
|---|---|---|
| CN | 101935483 | 1/2011 |
| CN | 102254584 | 11/2011 |
| CN | 102786838 | 11/2012 |
| EP | 130010 | 1/1985 |
| EP | 0307551 | 3/1989 |
| EP | 2208765 | 7/2010 |
| FR | 2183873 | 12/1973 |
| JP | 63-057677 | 3/1988 |
| JP | 2002-133944 | 5/2002 |
| JP | 2002-208534 | 7/2002 |
| JP | 2005-023415 | 1/2005 |
| JP | 2005-097326 | 4/2005 |
| JP | 2006-161128 | 6/2006 |
| JP | 2006-348160 | 12/2006 |
| JP | 2008-127657 | 6/2008 |
| JP | 2008-153136 | 7/2008 |
| JP | 2009-302090 | 12/2009 |
| JP | 2010-238825 | 10/2010 |
| JP | 4832615 | * 12/2011 |
| KR | 2011063039 | 6/2011 |
| KR | 2012080878 | 7/2012 |
| KR | 2012098157 | 9/2012 |
| WO | WO 2006/070747 | 7/2006 |
| WO | WO 2006/108165 | 10/2006 |
| WO | WO 2006/135113 | 12/2006 |
| WO | WO 2007/116649 | 10/2007 |
| WO | WO 2008/127397 | 10/2008 |
| WO | WO 2007/052564 | 5/2010 |
| WO | WO-2011158659 | * 12/2011 |

* cited by examiner

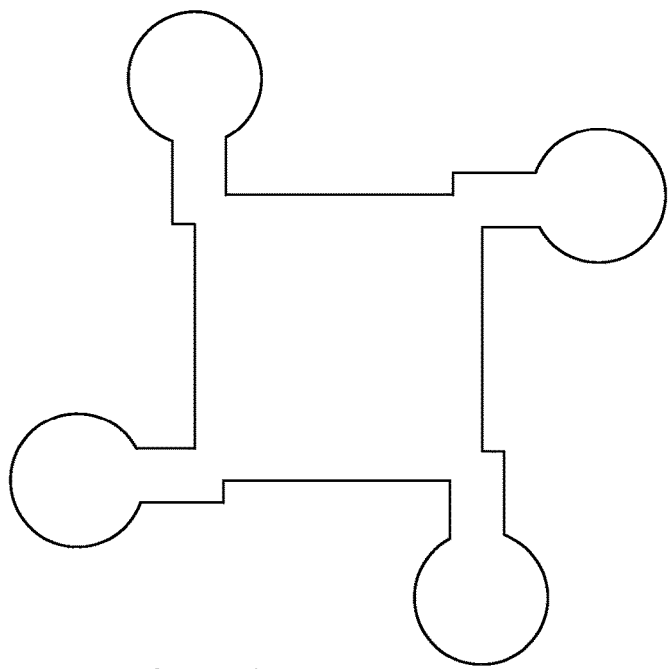
FIG. IA
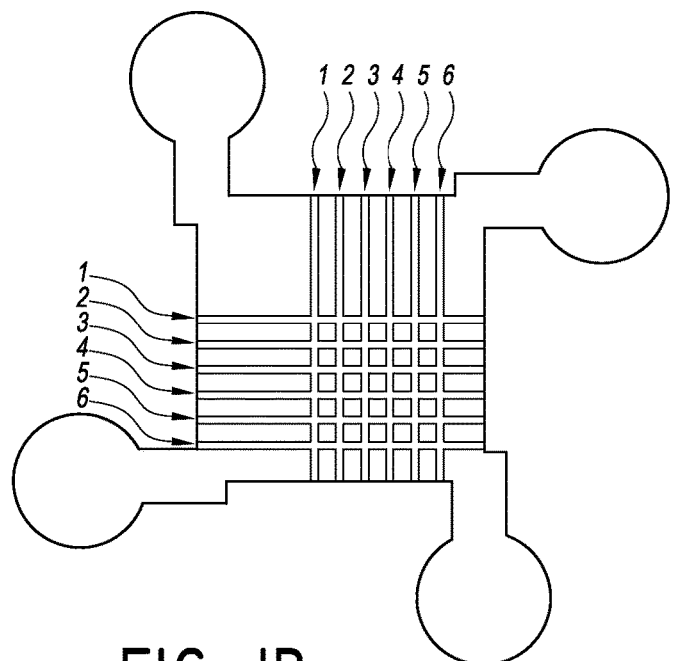
FIG. IB

NICKEL INKS AND OXIDATION RESISTANT AND CONDUCTIVE COATINGS

CROSS REFERENCE TO RELATED APPLICATIONS

This application claims priority benefit of U.S. Provisional Patent App. No. 61/747,093, filed Dec. 28, 2012, which is hereby incorporated by reference in its entirety.

BACKGROUND

Field

This application relates to a conductive ink, particularly to a conductive ink including nickel.

Description of the Related Art

The most common and highest performing conductive inks available on the market are silver inks. The biggest downside of these inks is cost due to silver content (varying from 1 to 2 dollars per gram). Copper inks are also available and are cheaper than silver inks; however, the copper inks themselves and the films printed using the copper inks are prone to oxidation and corrosion.

Nickel (Ni) has inherent metal conductivity, high resistance to oxidation and other types of corrosion, and is magnetic. Based on these properties, Ni inks find applications in many areas including conductive inks, decorative metallic paints, corrosion resistant coatings, antistatic coatings, and in radio frequency and electromagnetic shielding coatings.

Conductive screen printable Ni inks available on the market have a range of sheet resistance between about 5 Ohm/sq/mil and about 300 Ohm/sq/mil, which is relatively high compared to what one would expect from a metal ink. The relatively low conductivity of existing Ni inks might also explain why there are not many suppliers of such materials (e.g., existing suppliers include Creative Materials, Corp., Gwent Electronic Materials, Ltd., Engineered Conductive Materials, LLC, and Epoxies, etc.). There are also existing suppliers producing ink-jet printable nano Ni inks (e.g., Applied Nanotech Holdings, Inc.). Although, nanoinks cured at temperatures above 300° C. are highly conductive (e.g., they can become a thin metal film after curing), they are expensive and not applicable where a thicker coating or lower curing temperatures are needed. They are also more difficult to produce in large quantities due to the nanomaterials.

Therefore, there is a need for Ni ink having improved properties.

SUMMARY

A conductive ink may include a nickel component, a polycarboxylic acid component, and a polyol component, the polycarboxylic acid component and the alcohol polyol component being reactable to form a polyester component. The conductive ink may include an additive component and/or a carbon component.

In some embodiments, the nickel component can include at least one of nickel flakes, nickel nano/microwires, and nickel spheres. The nickel flakes may have a thickness of less than about 5 microns. The nickel flakes may have a diameter of about 100 nanometers to about 50 microns. The nickel flakes may have a diameter of about 500 nanometers to about 30 microns.

In some embodiments, the nickel component may be a filamentary nickel powder. The filamentary nickel powder may have a longest dimension in a range of about 2 microns to about 10 microns.

In some embodiments, the nickel component can have at least one particle having a longest dimension in a range of about 0.5 microns to about 50 microns. The nickel component may have at least one particle with a longest dimension in a range of about 0.5 microns to about 30 microns. The nickel component may have at least one particle with a longest dimension in a range of about 5 microns to about 20 microns.

The carbon component may include at least one of carbon flakes, carbon nano/microwires, and carbon spheres. The carbon component may have at least one of graphene, graphite, activated carbon, carbon nanotubes, and carbon nanofibers. The graphite may include a graphite powder. The graphene may include graphene flakes. In some embodiments, at least one of the graphene flakes may have a diameter of about 5 microns. In some embodiments, at least one of the graphene flakes may have a diameter of about 100 nanometers to about 50 microns.

In some embodiments, the polycarboxylic acid component can include a dicarboxylic acid. For example, the dicarboxylic acid may include at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, and an octadecanedioic acid.

In some embodiments, the polycarboxylic acid component can include a tricarboxylic acid. For example, the tricarboxylic acid may include at least one of a citric acid, an isocitric acid, an aconitic acid, a carballylic acid, a trimesic acid, and a terephthalic acid.

In some embodiments, the polycarboxylic acid component can include a hydroxicarboxilic acid. For example, the hydroxicarboxilic acid may include at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

The polyol component may include at least one of a glycerol and a glycol. In some embodiments, the polyol component can include at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

The additive component may include at least one of a viscosity modifier, a wetting agent, a flow and leveling agent, an adhesion promoter, and a corrosion inhibitor. For example, the wetting agent may include a polyethylene glycol. For example, the corrosion inhibitor may include at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

In some embodiments, the additive component includes a solvent. The solvent may include at least one of a viscosity modifier, a wetting agent, a flow and leveling agent, and an adhesion promoter. The solvent may include at least one of an alcohol and water. For example, the alcohol may include at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol. The N-propanol may include at least one of a 1-propanol, a 2-propanol, and a 1-methoxy-2-propanol. The butanol may include at least one of a 1-butanol and a 2-butanol. The pentanol may include at least one of a 1-pentanol, a 2-pentanol, and a 3-pentanol. The hexanol may include at least one of a 1-hexanol, a 2-hexanol, and a 3-hexanol. The N-octanol may include at least one of a 1-octanol, a 2-octanol, and a 3-octanol.

In some embodiments, the additive component may include a butyl lactone. In some embodiments, the additive component may include an ether. The ether may include at least one of a methyl ethyl ether, a diethyl ether, an ethyl propyl ether, and a polyether.

In some embodiments, the additive component can include a ketone. The ketone may include at least one of an acetone and a methyl ethyl ketone. In some embodiments, the ketone can include at least one of a diketone and a cyclic ketone. For example, the cyclic ketone may include at least one of a cyclohexanone, a cyclopentanone, a cycloheptanone, a cyclooctanone, a benzophenone, an acetylacetone, an acetophenone, a cyclopropanone, and an isophorone.

In some embodiments, the additive component can include an ester. The ester may include at least one of an ethyl acetate, a dimethyl adipate, a proplyene glycol monomethyl ether acetate, a dimethyl glutarate, a dimethyl succinate, a glycerin acetate, and a carboxylate.

In some embodiments, the additive component can include a carbonate. The carbonate may include a propylene carbonate.

In some embodiments, the additive component can include at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, and a tetradecane.

In some embodiments, the conductive ink has a viscosity at about 25° C. in a range from about 5,000 centipoise to about 11,000 centipoise.

In some embodiments, the nickel component is in a range from about 50 wt % to about 60 wt %. In some embodiments, the nickel component is in a range from about 35 wt % to about 65 wt %.

In some embodiments, the carbon component is in a range from about 0.5 wt % to about 2.5 wt %. In some embodiments, the carbon component is less than about 10 wt %.

In some embodiments, the polycarboxylic acid component is in a range from about 5 wt % to about 15 wt %.

In some embodiments, the polyol component is in a range from about 25 wt % to about 40 wt %. In some embodiments, the polyol component is in a range from about 15 wt % to about 60 wt %.

In some embodiments, the additive component is less than about 10%.

A conductive film may include a nickel component and a polyester component. In some embodiments, the conductive film may include an additive component and/or a carbon component.

In some embodiments, the nickel component can include at least one of nickel flakes, nickel nano/microwires, and nickel spheres. The nickel flakes may have a thickness of less than about 5 microns. The nickel flakes may have a diameter of about 100 nanometers to about 50 microns. The nickel flakes may have a diameter of about 500 nanometers to about 30 microns.

In some embodiments, the nickel component may be a filamentary nickel powder. The filamentary nickel powder may have a longest dimension in a range of about 2 microns to about 10 microns.

In some embodiments, the nickel component of the conductive film can have at least one particle having a longest dimension in a range of about 100 nanometers to about 50 microns. The nickel component may have at least one particle with a longest dimension in a range of about 0.5 microns to about 30 microns. The nickel component may have at least one particle with a longest dimension in a range of about 5 microns to about 20 microns.

The carbon component of the conductive film may include at least one of carbon flakes, carbon nano/microwires, and carbon spheres. The carbon component may have at least one of graphene, graphite, activated carbon, carbon nanotubes, and carbon nanofibers. The graphite may include a graphite powder. The graphene may include graphene flakes. In some embodiments, at least one of the graphene flakes may have a diameter of about 5 microns. In some embodiments, at least one of the graphene flakes may have a diameter of about 100 nanometers to about 50 microns.

In some embodiments, the polyester component of the conductive film can be formed in situ from a polycarboxylic acid component and a polyol component.

In some embodiments, the conductive film has a sheet resistance in a range from about 0.5 ohm/sq/mil to about 1.5 ohm/sq/mil. In some embodiments, the conductive film has a thickness in a range from about 4 microns to about 40 microns.

The conductive film may be printed onto a substrate. Suitable substrates may include a conductive substrate or a non-conductive substrate. The substrate may include at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.

A method of fabricating a conductive ink may include dispersing a nickel component in a solvent component, and dispersing a polyester component in the solvent component.

The method of fabricating the conductive ink may include dispersing a carbon component in the solvent component. Dispersing the nickel component in the solvent component may be before dispersing the polyester component in the solvent component. Dispersing the nickel component in the solvent component may be after dispersing the polyester component in the solvent component.

Dispersing the nickel component in the solvent component may be before dispersing the carbon component in the solvent component. In some embodiments, dispersing the nickel component in the solvent component can be after dispersing the carbon component in the solvent component.

In some embodiments, dispersing the carbon component in the solvent component can be before dispersing the polyester component in the solvent component. In some embodiments, dispersing the carbon component in the solvent component can be after dispersing the polyester component in the solvent component.

The method of fabricating the conductive ink can include adding an additive component to the solvent component.

Adding the additive component to the solvent component may be before dispersing the nickel component in the solvent. Adding the additive component to the solvent component may be after dispersing the nickel component in the solvent. Adding the additive component to the solvent component may be before dispersing the polyester component in the solvent. In some embodiments, adding the additive component to the solvent component can be after dispersing the polyester component in the solvent. In some embodiments, adding the additive component to the solvent component can be before dispersing the carbon component in the solvent. In some embodiments, adding the additive component to the solvent component can be after dispersing the carbon component in the solvent.

The conductive ink may be printable onto a substrate. Suitable substrates may include a conductive substrate or a non-conductive substrate. The substrate may include at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.

In some embodiments, the nickel component can include at least one of nickel flakes, nickel nano/microwires, and nickel spheres. The nickel flakes may have a thickness of less than about 5 microns. The nickel flakes may have a diameter of about 100 nanometers to about 50 microns. The nickel flakes may have a diameter of about 500 nanometers to about 30 microns.

In some embodiments, the nickel component may be a filamentary nickel powder. The filamentary nickel powder may have a longest dimension in a range of about 2 microns to about 10 microns.

In some embodiments, the nickel component of the conductive ink can have at least one particle having a longest dimension in a range of about 100 nanometers to about 50 microns. The nickel component may have at least one particle with a longest dimension in a range of about 0.5 microns to about 30 microns. The nickel component may have at least one particle with a longest dimension in a range of about 5 microns to about 20 microns.

The carbon component of the conductive ink may include at least one of carbon flakes, carbon nano/microwires, and carbon spheres. The carbon component may have at least one of graphene, graphite, activated carbon, carbon nanotubes, and carbon nanofibers. The graphite may include a graphite powder. The graphene may include graphene flakes. In some embodiments, at least one of the graphene flakes may have a diameter of about 5 microns. In some embodiments, at least one of the graphene flakes may have a diameter of about 100 nanometers to about 50 microns.

In some embodiments, the polyester component can be formed from a polycarboxylic acid component and a polyol component.

In some embodiments, the polycarboxylic acid component can include a dicarboxylic acid. For example, the dicarboxylic acid may include at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, and an octadecanedioic acid.

In some embodiments, the polycarboxylic acid component can include a tricarboxylic acid. For example, the tricarboxylic acid may include at least one of a citric acid, an isocitric acid, an aconitic acid, a carballylic acid, a trimesic acid, and a terephthalic acid.

In some embodiments, the polycarboxylic acid component can include a hydroxicarboxilic acid. For example, the hydroxicarboxilic acid may include at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

The polyol component may include at least one of a glycerol and a glycol. In some embodiments, the polyol component can include at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

The additive component may include at least one of a viscosity modifier, a wetting agent, a flow and leveling agent, an adhesion promoter, and a corrosion inhibitor. For example, the wetting agent may include a polyethylene glycol. For example, the corrosion inhibitor may include at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

In some embodiments, the additive component includes a solvent. The solvent may include at least one of a viscosity modifier, a wetting agent, a flow and leveling agent, and an adhesion promoter. The solvent may include at least one of an alcohol and water. For example, the alcohol may include at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol. The N-propanol may include at least one of a 1-propanol, a 2-propanol, and a 1-methoxy-2-propanol. The butanol may include at least one of a 1-butanol and a 2-butanol. The pentanol may include at least one of a 1-pentanol, a 2-pentanol, and a 3-pentanol. The hexanol may include at least one of a 1-hexanol, a 2-hexanol, and a 3-hexanol. The N-octanol may include at least one of a 1-octanol, a 2-octanol, and a 3-octanol.

In some embodiments, the additive component may include a butyl lactone. In some embodiments, the additive component may include an ether. The ether may include at least one of a methyl ethyl ether, a diethyl ether, an ethyl propyl ether, and a polyether.

In some embodiments, the additive component can include a ketone. The ketone may include at least one of an acetone and a methyl ethyl ketone. In some embodiments, the ketone can include at least one of a diketone and a cyclic ketone. For example, the cyclic ketone may include at least one of a cyclohexanone, a cyclopentanone, a cycloheptanone, a cyclooctanone, a benzophenone, an acetylacetone, an acetophenone, a cyclopropanone, and an isophorone.

In some embodiments, the additive component can include an ester. The ester may include at least one of an ethyl acetate, a dimethyl adipate, a proplyene glycol monomethyl ether acetate, a dimethyl glutarate, a dimethyl succinate, a glycerin acetate, and a carboxylate.

In some embodiments, the additive component can include a carbonate. The carbonate may include a propylene carbonate.

In some embodiments, the additive component can include at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, and a tetradecane.

In some embodiments, the conductive ink can have a viscosity at about 25° C. in a range from about 5,000 centipoise to about 11,000 centipoise.

In some embodiments, the nickel component is in a range from about 50 wt % to about 60 wt %. In some embodiments, the method of any one of embodiments 80 to 143, wherein the nickel component is in a range from about 35 wt % to about 65 wt %.

In some embodiments, the carbon component is in a range from about 0.5 wt % to about 2.5 wt %. In some embodiments, the carbon component is less than about 10 wt %.

In some embodiments, the additive component is less than about 10 wt %.

A method of fabricating a conductive film may include printing a conductive ink on a substrate. The conductive ink may include a nickel component, and a polyester component. In some embodiments, the method of fabricating the conductive film can include curing the printed conductive ink.

Printing the conductive ink may include at least one of a screen printing process, a coating process, a rolling process, a spraying process, a layering process, a spin coating process, a lamination process, an affixing process, an inkjet printing process, an electro-optical printing process, an electroink printing process, a resist printing process, a thermal printing process, a laser jet printing process, a magnetic printing process, a pad printing process, a flexographic printing process, a hybrid offset lithography process, a intaglio printing process, and a die slot deposition process.

The screen printing process may include using a polyester screen. The screen printing process may include using a polyamide screen. The screen printing process may include using a screen having a mesh size of about 110 or about 135.

The conductive ink may be printable onto a substrate. Suitable substrates may include a conductive substrate or a non-conductive substrate. The substrate may include at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.

In some embodiments, curing the printed conductive ink can include heating the printed conductive ink and the substrate to a temperature in a range from about 100° C. to about 200° C. Curing the printed conductive ink may include heating the printed conductive ink and the substrate to a temperature in a range from about 130° C. to about 140° C.

In some embodiments, curing the printed conductive ink can include heating the printed conductive ink and the substrate for a duration from about 20 seconds to about 1 hour. In some embodiments, curing the printed conductive ink can include heating the printed conductive ink and the substrate for a duration from about 3 minutes to about 10 minutes.

In some embodiments, the nickel component can include at least one of nickel flakes, nickel nano/microwires, and nickel spheres. The nickel flakes may have a thickness of less than about 5 microns. The nickel flakes may have a diameter of about 100 nanometers to about 50 microns. The nickel flakes may have a diameter of about 500 nanometers to about 30 microns.

In some embodiments, the nickel component may be a filamentary nickel powder. The filamentary nickel powder may have a longest dimension in a range of about 2 microns to about 10 microns.

In some embodiments, the nickel component of the conductive film can have at least one particle having a longest dimension in a range of about 0.5 microns to about 50 microns. The nickel component may have at least one particle with a longest dimension in a range of about 0.5 microns to about 30 microns. The nickel component may have at least one particle with a longest dimension in a range of about 5 microns to about 20 microns.

The carbon component of the conductive film may include at least one of carbon flakes, carbon nano/microwires, and carbon spheres. The carbon component may have at least one of graphene, graphite, activated carbon, carbon nanotubes, and carbon nanofibers. The graphite may include a graphite powder. The graphene may include graphene flakes. In some embodiments, at least one of the graphene flakes may have a diameter of about 5 microns. In some embodiments, at least one of the graphene flakes may have a diameter of about 100 nanometers to about 50 microns.

In some embodiments, the polyester component can be formed from a polycarboxylic acid component and a polyol component.

In some embodiments, the polycarboxylic acid component can include a dicarboxylic acid. For example, the dicarboxylic acid may include at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, and an octadecanedioic acid.

In some embodiments, the polycarboxylic acid component can include a tricarboxylic acid. For example, the tricarboxylic acid may include at least one of a citric acid, an isocitric acid, an aconitic acid, a carballylic acid, a trimesic acid, and a terephthalic acid.

In some embodiments, the polycarboxylic acid component can include a hydroxicarboxilic acid. For example, the hydroxicarboxilic acid may include at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

The polyol component may include at least one of a glycerol and a glycol. In some embodiments, the polyol component can include at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4- butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

In some embodiments, the conductive ink can include an additive component.

The additive component may include at least one of a viscosity modifier, a wetting agent, a flow and leveling agent, an adhesion promoter, and a corrosion inhibitor. For example, the wetting agent may include a polyethylene glycol. For example, the corrosion inhibitor may include at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

In some embodiments, the additive component includes a solvent. The solvent may include at least one of a viscosity modifier, a wetting agent, a flow and leveling agent, and an adhesion promoter. The solvent may include at least one of an alcohol and water. For example, the alcohol may include at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol. The N-propanol may include at least one of a 1-propanol, a 2-propanol, and a 1-methoxy-2-propanol. The butanol may include at least one of a 1-butanol and a 2-butanol. The pentanol may include at least one of a 1-pentanol, a 2-pentanol, and a 3-pentanol. The hexanol may include at least one of a 1-hexanol, a 2-hexanol, and a 3-hexanol. The N-octanol may include at least one of a 1-octanol, a 2-octanol, and a 3-octanol.

In some embodiments, the additive component may include a butyl lactone. In some embodiments, the additive component may include an ether. The ether may include at least one of a methyl ethyl ether, a diethyl ether, an ethyl propyl ether, and a polyether.

In some embodiments, the additive component can include a ketone. The ketone may include at least one of an acetone and a methyl ethyl ketone. In some embodiments, the ketone can include at least one of a diketone and a cyclic ketone. For example, the cyclic ketone may include at least one of a cyclohexanone, a cyclopentanone, a cycloheptanone, a cyclooctanone, a benzophenone, an acetylacetone, an acetophenone, a cyclopropanone, and an isophorone.

In some embodiments, the additive component can include an ester. The ester may include at least one of an ethyl acetate, a dimethyl adipate, a proplyene glycol monomethyl ether acetate, a dimethyl glutarate, a dimethyl succinate, a glycerin acetate, and a carboxylate.

In some embodiments, the additive component can include a carbonate. The carbonate may include a propylene carbonate.

In some embodiments, the additive component can include at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, and a tetradecane.

The conductive ink comprises a viscosity at 25° C. in a range from about 5,000 centipoise to about 11,000 centipoise.

In some embodiments, the nickel component of the conductive film can be in a range from about 50 wt % to about 60 wt %. In some embodiments, the nickel component can be is in a range from about 35 wt % to about 65 wt %.

In some embodiments, the carbon component can be in a range from about 0.5 wt % to about 2.5 wt %. In some embodiments, the carbon component of the conductive film can be less than about 10 wt %.

In some embodiments, the additive component can be less than about 10 wt %.

A method of fabricating a conductive ink may include dispersing a nickel component in an polyol component, and dispersing a polycarboxylic acid component in the polyol component, where the polycarboxylic acid component and the polyol component are reactable to form a polyester component.

In some embodiments, dispersing the polycarboxylic acid component in the polyol component forms the polyester component in situ.

In some embodiments, the method of fabricating a conductive ink can include dispersing a carbon component in the polyol component.

Dispersing the nickel component in the polyol component can be before dispersing the polycarboxylic acid component in the polyol component. Dispersing the nickel component in the polyol component can be after dispersing the polycarboxylic acid component in the polyol component.

In some embodiments, dispersing the nickel component in the polyol component can be before dispersing the carbon component in the polyol component. In some embodiments, dispersing the nickel component in the polyol component can be after dispersing the carbon component in the polyol component.

In some embodiments, dispersing the carbon component in the polyol component can be before dispersing the polycarboxylic acid component in the polyol component. In some embodiments, dispersing the carbon component in the polyol component can be after dispersing the polycarboxylic acid component in the polyol component.

The method of fabricating a conductive ink can include adding an additive component.

In some embodiments, adding the additive component can be before dispersing the nickel component in the polyol component. In some embodiments, adding the additive component can be after dispersing the nickel component in the polyol component. In some embodiments, adding the additive component can be before dispersing the polycarboxylic acid component in the polyol component. In some embodiments, adding the additive component can be after dispersing the polycarboxylic acid component in the polyol component. In some embodiments, adding the additive component can be before dispersing the carbon component in the polyol component. In some embodiments, adding the additive component can be after dispersing the carbon component in the polyol component.

The conductive ink may be printable onto a substrate. Suitable substrates may include a conductive substrate or a non-conductive substrate. For example, a substrate may include at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.

In some embodiments, the nickel component can include at least one of nickel flakes, nickel nano/microwires, and nickel spheres. The nickel flakes may have a thickness of less than about 5 microns. The nickel flakes may have a diameter of about 100 nanometers to about 50 microns. The nickel flakes may have a diameter of about 500 nanometers to about 30 microns.

In some embodiments, the nickel component may be a filamentary nickel powder. The filamentary nickel powder may have a longest dimension in a range of about 2 microns to about 10 microns.

In some embodiments, the nickel component can have at least one particle having a longest dimension in a range of about 0.5 microns to about 50 microns. The nickel component may have at least one particle with a longest dimension in a range of about 0.5 microns to about 30 microns. The nickel component may have at least one particle with a longest dimension in a range of about 5 microns to about 20 microns.

The carbon component may include at least one of carbon flakes, carbon nano/microwires, and carbon spheres. The carbon component may have at least one of graphene, graphite, activated carbon, carbon nanotubes, and carbon nanofibers. The graphite may include a graphite powder. The graphene may include graphene flakes. In some embodiments, at least one of the graphene flakes may have a diameter of about 5 microns. In some embodiments, at least one of the graphene flakes may have a diameter of about 100 nanometers to about 50 microns.

In some embodiments, the polycarboxylic acid component can include a dicarboxylic acid. For example, the dicarboxylic acid may include at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, and an octadecanedioic acid.

In some embodiments, the polycarboxylic acid component can include a tricarboxylic acid. For example, the tricarboxylic acid may include at least one of a citric acid, an isocitric acid, an aconitic acid, a carballylic acid, a trimesic acid, and a terephthalic acid.

In some embodiments, the polycarboxylic acid component can include a hydroxicarboxilic acid. For example, the hydroxicarboxilic acid may include at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

The polyol component may include at least one of a glycerol and a glycol. In some embodiments, the polyol component can include at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

The additive component may include at least one of a viscosity modifier, a wetting agent, a flow and leveling agent, an adhesion promoter, and a corrosion inhibitor. For example, the wetting agent may include a polyethylene glycol. For example, the corrosion inhibitor may include at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

In some embodiments, the additive component includes a solvent. The solvent may include at least one of a viscosity modifier, a wetting agent, a flow and leveling agent, and an adhesion promoter. The solvent may include at least one of an alcohol and water. For example, the alcohol may include at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol. The N-propanol may include at least one of a 1-propanol, a 2-propanol, and a 1-methoxy-2-propanol. The butanol may include at least one of a 1-butanol and a 2-butanol. The pentanol may include at least one of a 1-pentanol, a 2-pentanol, and a 3-pentanol. The hexanol may include at least one of a 1-hexanol, a 2-hexanol, and a 3-hexanol. The N-octanol may include at least one of a 1-octanol, a 2-octanol, and a 3-octanol.

In some embodiments, the additive component may include a butyl lactone. In some embodiments, the additive component may include an ether. The ether may include at least one of a methyl ethyl ether, a diethyl ether, an ethyl propyl ether, and a polyether.

In some embodiments, the additive component can include a ketone. The ketone may include at least one of an acetone and a methyl ethyl ketone. In some embodiments, the ketone can include at least one of a diketone and a cyclic ketone. For example, the cyclic ketone may include at least one of a cyclohexanone, a cyclopentanone, a cycloheptanone, a cyclooctanone, a benzophenone, an acetylacetone, an acetophenone, a cyclopropanone, and an isophorone.

In some embodiments, the additive component can include an ester. The ester may include at least one of an ethyl acetate, a dimethyl adipate, a proplyene glycol monomethyl ether acetate, a dimethyl glutarate, a dimethyl succinate, a glycerin acetate, and a carboxylate.

In some embodiments, the additive component can include a carbonate. The carbonate may include a propylene carbonate.

In some embodiments, the additive component can include at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, and a tetradecane.

In some embodiments, the conductive ink has a viscosity at about 25° C. in a range from about 5,000 centipoise to about 11,000 centipoise.

In some embodiments, the nickel component is in a range from about 50 wt % to about 60 wt %. In some embodiments, the nickel component is in a range from about 35 wt % to about 65 wt %.

In some embodiments, the carbon component is in a range from about 0.5 wt % to about 2.5 wt %. In some embodiments, the carbon component is less than about 10 wt %.

In some embodiments, the polycarboxylic acid component is in a range from about 5 wt % to about 15 wt %.

In some embodiments, the polyol component is in a range from about 25 wt % to about 40 wt %. In some embodiments, the polyol component is in a range from about 15 wt % to about 60 wt %.

In some embodiments, the additive component is less than about 10%.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

FIG. 1A is a plan view of a nickel ink printed in a design usable to determine a resistance of the printed nickel ink by van der Pauw measurement.

FIG. 1B is a plan view of a nickel ink printed in a design after performance of a tape test for measuring adhesion.

DETAILED DESCRIPTION

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

In some embodiments, a conductive ink comprises a nickel flake, which has a relatively low cost (e.g., about 0.01 cents per gram to about 0.05 cents per gram). In some embodiments, the ink has good adherence to many types of substrates and/or can be completely cured at about 130° C. to about 140° C. and higher temperatures for a duration of about 3 minutes (min) to about 10 min. The ink's viscosity may be designed for screen printing and may be in the range of about 5,000 centipoise (cP) to about 11,000 cP at room temperature (about 25° C.). In some embodiments, the shelf life of the ink is at least about 3 months. In some embodiments, a printed film (e.g., printed from the conductive ink) or coating comprises nickel flakes, carbon additive, and polyester. The printed film may have high conductivity (e.g., sheet resistance of about 0.5 Ohm/sq/mil to about 1.5 Ohm/sq/mil). The coatings may have a thickness of about 4 microns (μm) to about 40 μm.

The ink may be designed for use in various layers of a printed energy storage device (e.g., as a current collector layer). Embodiments of example printed energy storage devices are provided in U.S. Provisional Patent Application No. 61/712,219, filed Oct. 10, 2012, which is incorporated herein by reference in its entirety. See, for example, FIGS. 1 and 2 and pages 4-8 of the '219 application.

In some embodiments, the conductive ink can be used as a conductive ink for other applications, for example an antistatic coating and/or in radio frequency and electromagnetic shielding coating.

In some embodiments, the conductive ink can facilitate an efficient portable energy storage system, which can help to enhance the use of stored power, reducing overall energy consumption. The conductive ink may be recyclable, for example because the components can be separated. In some embodiments, the conductive ink comprises components which are non-toxic such that, for example, the conductive ink can be disposed in a landfill without special procedures without adversely impacting the environment.

Example Composition and its Preparation Procedure

One embodiment of a composition of a conductive ink comprising nickel flake is presented in Table 1, along with the corresponding printing conditions in Table 2, and the parameters of the corresponding printed film are presented in Table 3.

The example ink composition presented in Table 1 was chosen by the parameters of the film printed from it (Table 3 shows the parameters). Adhesion of films to substrates was satisfactory on the majority of inks, so a key criterion for the ink composition presented in Table 1 was a balance between conductivity (described herein in terms of sheet resistance, Ohm/sq/mil) and smoothness of the printed film.

TABLE 1

| Ink Composition | | | | | |
|---|---|---|---|---|---|
| | Ink component | | | | |
| | Nickel | Carbon | Poly-carboxylic Acid | Polyol | Other additives |
| Variety | Flakes, 1 micron thick, 5-20 microns in diameter | Graphene flakes, 5 microns in diameter | Glutaric acid | Ethylene glycol | N/A |
| Weight Percent, wt % | 55.6 | 1.4 | 10.2 | 32.8 | None |

In some embodiments, the ink composition of Table 1 can be prepared using the following process: Graphene flakes are mixed with ethylene glycol and sonicated for 30 min at 90° C. to disperse the graphene flakes in the ethylene glycol. Nickel flakes are added to the mixture of graphene flakes and ethylene glycol, stirred with a stirrer (e.g., using a Lab Egg) for 10 min at 100° C. and sonicated for 30 min at 90° C. to disperse the Ni flakes in the ethylene glycol and with the graphene flakes. The graphene may be between nickel flakes (e.g., Ni-graphene-Ni), which can increase inter-particle contact and improve conductivity. The graphene may be between nickel flakes (e.g., Ni-graphene-Ni), which can reduce agglomeration. The mixture of graphene flakes, Ni flakes, and ethylene glycol is then heated to 100° C. and glutaric acid is added. The mixture of graphene flakes, Ni flakes, ethylene glycol, and glutaric acid is stirred (e.g., using a Lab Egg) for 30 min and cooled down.

In some embodiments, components of the ink may be combined at the same time (e.g., simultaneously or substantially simultaneously). For example, the graphene flakes, ethylene glycol, nickel flakes, and the glutaric acid may be combined at the same time to form a mixture. In some embodiments, the mixture can be heated after dispersion off all of the components. In some embodiments, the mixture can be heated to a temperature of about 80° C. to about 120° C. (e.g., about 100° C.), for example to inhibit or prevent formation of polymer before curing.

In some embodiments, a polyester may be formed upon mixing an alcohol and an acid. For example, a polyester may be formed upon heating of a mixture comprising an alcohol component and an acid component. In some embodiments, an ink mixture comprises a polyester component that is formed in situ (e.g., within or during formation of the ink, including for example during curing of the conductive ink to form a conductive film). In situ formation of the polyester component may provide a controllable process for the formation of the polyester component, may better disperse in the ink, and/or may increase interaction with nickel components, carbon components, and/or additives. In the ink, the acid can etch non-conductive materials such as nickel oxide from nickel components, which can increase conductivity since more conductive nickel is exposed. Once the acid is converted to polymer during curing, oxide is less likely to form on the nickel components, for example due to being at least partially surrounded by polymer. A polymer in an ink can inhibit printing or cause poor printability, and forming a polymer during curing after printing can advantageously avoid any impact of polymer in ink during printing.

In some embodiments, a polyester component can be formed external to the ink (e.g., made separately, purchased, etc.) and added directly. For example, fabricating a conductive nickel ink may include adding a polyester component to a mixture instead of or in addition to forming the polyester component in situ. Adding a pre-formed polyester component to the ink may simplify the fabrication process by incorporating a known quantity and variety (e.g., average molecular weight, a polymer size, monomers and/or repeating units, etc.) of the polyester component. Polymer size may be adjusted, for example, to adjust printability.

The ink composition of Table 1 may be printed using a screen printing technique. An example of possible screen printing parameters are presented in Table 2.

TABLE 2

| Printing Conditions | | | | |
|---|---|---|---|---|
| Viscosity at 25° C., cP | Mesh type | Mesh size | Curing temperature, ° C. | Curing time, min |
| 9,000 | Polyester | 110 | 138 | 10 |

The parameters of the example printed film are presented in Table 3. The thickness measurement was conducted using an electronic thickness gauge. Sheet resistance was measured using the van der Pauw technique. For example, commonly practiced methods associated with the van der Pauw techniques may be applied to one or more printed conductive films described herein to evaluate a sheet resistance of the printed conductive film. For example, the ink printed in a special design, as shown in FIG. 1A, can be used when applying the van der Pauw technique to determine a sheet resistance.

To evaluate the adhesiveness of a printed nickel conductive film to a substrate, a cross-cut test may be used, including for example an ISO 2409 Cross Cut Test. A cross-cut test may be used to determine whether a printed film exhibits adequate adhesion to a substrate. In some embodiments, a cross-cut test can allow categorizing an adhesiveness of the printed film according to predetermined levels of adhesiveness.

In a cross-cut test, a lattice pattern having a set of six cuts in each of two directions may be made in a printed conductive nickel film. The six cuts in each set may be parallel or substantially parallel to one another. The first set of six cuts may be perpendicular or substantially perpendicular to the second set of six cuts. The cutting may be performed with a single blade knife and/or a multi-blade cutting tool. For example, a multi-blade cutting tool may have blades spaced about 1 millimeter or about 2 millimeters apart. Spacing of the cuts in each set of cuts may depend on a thickness of the printed conductive film and/or a hardness of the substrate on which the film is printed. For example, cuts spaced about 1 millimeter apart may be applied to a printed film having a thickness of less than about 60 microns and where the film is printed on a hard substrate. For example, cuts spaced about 2 millimeters apart may be applied to a printed film having a thickness of about 60 microns to about 120 microns and where the film is printed on a soft substrate. In some embodiments, cuts spaced about 3 millimeters apart can be applied to a printed film having a thickness of about 120 microns to about 250 microns and where the film is printed on either a hard or soft substrate. The cuts may penetrate through to the substrate on which the film is printed.

Pressure sensitive tape (e.g., an Elcometer ISO 2409 Adhesive Tape) can be applied over the cuts in the printed film and then pulled off. Adhesiveness of the printed film may be categorized according to predetermined levels of adhesiveness by comparing the appearance of the printed film after removing the pressure sensitive tape to description providing standards for each of the levels. The ISO 2409 Cross-cut test may allow categorizing adhesiveness of a printed film based on six predetermined levels, for example levels 0 through 5, level 0 corresponding to a high level of adhesiveness and level 5 corresponding a low level of adhesiveness. For example, level 0 may be appropriate if the printed film shows no detachment from the substrate after removal of the pressure sensitive tape. A level 1 may be appropriate if less than about 5% of a surface area (e.g., a percentage of a surface area over which the pressure sensitive film was applied) of the printed film detached from the substrate, level 2 if between about 5% to about 15% of the surface area detached, level 3 if between about 15% to about 35% of the surface area detached, and level 4 if between about 35% to about 65% of the surface area detached. A level 5 may be appropriate if detachment of the printed film is more severe than that described in level 4. FIG. 1B illustrates an example printed film after a cross-cut adhesion test, in which the film exhibits six vertical and horizontal striations. Although the pattern of FIG. 1B is also a pattern suitable for use with certain resistance measurements, a printed structure for an adhesion test may take any suitable pattern (e.g., tall and wide enough for the horizontal and vertical cuts).

TABLE 3

| Printed Film Properties | | |
|---|---|---|
| Substrate | Resistance, Ohm/sq/mil | Adhesion (0-5 range) |
| Biaxially-oriented polyethylene terephthalate (e.g., Mylar®) | 0.8 | 1 |

Example Ink Compositions with Slight Variations of the Components of the Example Ink Composition Presented in Table 1

Change of Ni Flakes to Filamentary Ni Powder

| Ink component | | | | |
|---|---|---|---|---|
| Nickel | Carbon | Poly-carboxylic Acid | Polyol | Other additives |
| Variety: Filamentary Nickel powder, 2-10 micron | Graphene flakes, 5 microns in diameter | Glutaric acid | Ethylene glycol | N/A |
| Weight Percent, wt %: 45.2 | 0.9 | 8.2 | 45.6 | |

Change of Graphene Flake Diameter from 5 μm to 25 μm

| Ink component | | | | |
|---|---|---|---|---|
| Nickel | Carbon | Poly-carboxylic Acid | Polyol | Other additives |
| Variety: Flakes, 1 micron thick, 5-20 microns in diameter | Graphene flakes, 25 microns in diameter | Glutaric acid | Ethylene glycol | N/A |
| Weight Percent, wt %: 52.8 | 1.1 | 9.6 | 36.6 | |

Change of Graphene Flakes to Graphite Powder

| Ink component | | | | |
|---|---|---|---|---|
| Nickel | Carbon | Polycarboxylic Acid | Polyol | Other additives |
| Variety: Flakes, 1 micron thick, 5-20 microns in diameter | Graphite powder | Glutaric acid | Ethylene glycol | N/A |
| Weight Percent, wt %: 52.8 | 1.1 | 9.6 | 36.6 | |

Change in Concentration of Carbon Additive from 1.4 Wt % to 0 Wt %

| Ink component | | | | |
|---|---|---|---|---|
| Nickel | Carbon | Polycarboxylic Acid | Polyol | Other additives |
| Variety: Flakes, 1 micron thick, 5-20 microns in diameter | N/A | Glutaric acid | Ethylene glycol | N/A |
| Weight Percent, wt %: 57.1 | 0 | 10.1 | 32.8 | |

Change in Concentration of Carbon Additive from 1.4 Wt % to 0.6 Wt %

| Ink component | | | | |
|---|---|---|---|---|
| Nickel | Carbon | Polycarboxylic Acid | Polyol | Other additives |
| Variety: Flakes, 1 micron thick, 5-20 microns in diameter | Graphene flakes, 5 microns in diameter | Glutaric acid | Ethylene glycol | N/A |
| Weight Percent, wt %: 56.2 | 0.6 | 10.1 | 33.1 | |

Change in Concentration of Carbon Additive from 1.4 Wt % to 5.8 Wt %

| Ink component | | | | |
|---|---|---|---|---|
| Nickel | Carbon | Polycarboxylic Acid | Polyol | Other additives |
| Variety: Flakes, 1 micron thick, 5-20 microns in diameter | Graphene flakes, 5 microns in diameter | Glutaric acid | Ethylene glycol | N/A |
| Weight Percent, wt %: 51.3 | 5.8 | 10.1 | 32.8 | |

Change of Acid from Glutaric Acid to Malonic Acid

| Ink component | | | | |
|---|---|---|---|---|
| Nickel | Carbon | Polycarboxylic Acid | Polyol | Other additives |
| Variety: Flakes, 1 micron thick, 5-20 microns in diameter | Graphene flakes, 5 microns in diameter | Malonic acid | Ethylene glycol | N/A |
| Weight Percent, wt %: 57.2 | 1.2 | 8.2 | 33.4 | |

Change of Alcohol from Ethylene Glycol to 1,3 Propylene Glycol

| Ink component | | | | |
|---|---|---|---|---|
| Nickel | Carbon | Polycarboxylic Acid | Polyol | Other additives |
| Variety: Flakes, 1 micron thick, 5-20 microns in diameter | Graphene flakes, 5 microns in diameter | Glutaric acid | 1,3 propylene glycol | N/A |
| Weight Percent, wt %: 56.0 | 1.2 | 10.1 | 32.7 | |

Addition of Polyethylene Glycol 600 as Additive

| Ink component | | | | |
|---|---|---|---|---|
| Nickel | Carbon | Polycarboxylic Acid | Polyol | Other additives |
| Variety: Flakes, 1 micron thick, 5-20 microns in diameter | Graphene flakes, 5 microns in diameter | Glutaric acid | Ethylene glycol | Polyethylene glycol (600) as wetting agent |
| Weight Percent, wt %: 56.0 | 1.2 | 10.1 | 26.4 | 6.3 |

Addition of N,N-Diethylhydroxlyamine as Additive

| Ink component | Nickel | Carbon | Polycarboxylic Acid | Polyol | Other additives |
|---|---|---|---|---|---|
| Variety | Flakes, 1 micron thick, 5-20 microns in diameter | Graphene flakes, 5 microns in diameter | Glutaric acid | Ethylene glycol | N,N-diethylhydroxylamine as antioxidant |
| Weight Percent, wt % | 54.9 | 1.4 | 10.0 | 32.4 | 1.4 |

The adhesion for all of these compositions, as measured using the ISO test described above, was 1, although the adhesion of the compositions including filamentary nickel powder and graphite powder were each 3. The resistance for each modified composition was about the same as the resistance of the composition of Table 1, but other printability parameters (e.g., thickness and smoothness) were not as good.

Example Variations in Ink Composition from the Example Composition Presented in Table 1 and/or the Printing Parameters from the Example Printing Parameters Presented in Table 2

Change in Viscosity by Adding More Ethylene Glycol to the Composition of Table 1

| Viscosity at 25° C., cP | Mesh type | Mesh size | Curing temperature, ° C. | Curing time, min |
|---|---|---|---|---|
| 6,000 | Polyester | 110 | 138 | 10 |

| Ink component | Nickel | Carbon | Polycarboxylic Acid | Glycol |
|---|---|---|---|---|
| Variety | Flakes, 1 micron thick, 5-20 microns in diameter | Graphene flakes, 5 microns in diameter | Glutaric acid | Ethylene glycol |
| Weight Percent, wt % | 54.2 | 1.1 | 9.9 | 34.8 |

Change in Viscosity by Adding Less Ethylene Glycol to the Composition of Table 1

| Viscosity at 25° C., cP | Mesh type | Mesh size | Curing temperature, ° C. | Curing time, min |
|---|---|---|---|---|
| 11,000 | Polyester | 110 | 138 | 10 |

| Ink component | Nickel | Carbon | Polycarboxylic Acid | Polyol |
|---|---|---|---|---|
| Variety | Flakes, 1 micron thick, 5-20 microns in diameter | Graphene flakes, 5 microns in diameter | Glutaric acid | Ethylene glycol |
| Weight Percent, wt % | 57.6 | 1.2 | 10.4 | 30.8 |

Change of Substrate from Mylar to Polyamide

| Viscosity at 25° C., cP | Mesh type | Mesh size | Curing temperature, ° C. | Curing time, min |
|---|---|---|---|---|
| 9,000 | Polyester | 110 | 138 | 10 |

Change of Mesh Type from Polyester to a Polyamide (e.g., Nylon)

| Viscosity at 25° C., cP | Mesh type | Mesh size | Curing temperature, ° C. | Curing time, min |
|---|---|---|---|---|
| 9,000 | Nylon | 110 | 138 | 10 |

Change of Mesh Size from 110 to 135

| Viscosity at 25° C., cP | Mesh type | Mesh size | Curing temperature, ° C. | Curing time, min |
|---|---|---|---|---|
| | Polyester | 135 | 138 | 10 |

Change of Curing Temperature from 138° C. to 143° C.

| Viscosity at 25° C., cP | Mesh type | Mesh size | Curing temperature, ° C. | Curing time, min |
|---|---|---|---|---|
| | Polyester | 110 | 143 | 10 |

Change of Curing Time from 10 Min to 5 Min

| Viscosity at 25° C., cP | Mesh type | Mesh size | Curing temperature, ° C. | Curing time, min |
|---|---|---|---|---|
| | Polyester | 110 | 138 | 5 |

Alternative Techniques

Ink Preparation Techniques

All kinds of mixing and dispersing techniques may be used, including, for example, mixing with a stir rod, mixing with magnetic stirrer, mixing under heating, vortexing (e.g., using a Vortex machine), shaking (using shakers), mixing by rotation, sonication, mortar and pestle, three-roll mill, combinations thereof, and the like.

Printing Techniques

"Printing" includes any and all printing processes, coating, rolling, spraying, layering, spin coating, lamination, and/or affixing processes, including, for example, screen printing, inkjet printing, electro-optical printing, electroink printing, photoresist and other resist printing, thermal printing, laser jet printing, magnetic printing, pad printing, flexographic printing, hybrid offset lithography, Gravure and other intaglio printing, die slot deposition, combinations thereof, and the like. Screen printing with different mesh sizes and screen types are also possible.

Curing Conditions

A wide variety of temperature and curing time durations may be used depending on solvents used. The temperature is generally from about 100° C. to about 200° C. Drying duration can vary from about 20 seconds to about 1 hour.

The atmosphere can be ambient, inert, vacuum, combinations thereof, and the like.

Alternative Components

Substrates

In some embodiments, substrates can be conductive and/or non-conductive. For example, a substrate can comprise graphite paper, graphene paper, polyester film (e.g., Mylar®), polyimide film, aluminum (Al) foil, copper (Cu) foil, stainless steel foil, carbon foam, polycarbonate film, paper, coated paper, plastic coated paper, fiber paper, cardboard, combinations thereof, and the like.

Nickel Powders

In some embodiments, the nickel comprises particles of any shape. For example, the nickel can comprise flakes, nano/microwires, spheres, a random particles shape, combinations thereof, and the like. Nickel flakes may be available commercially (e.g., from Novamet Specialty Products Corp., of Wyckoff, N.J.). Nickel particles may have a thickness of less than about 5 microns. In some embodiments, nickel particles can have a thickness of about 1 micron. Nickel particles may be of all printable sizes (e.g., a length and/or a diameter from about 100 nanometers (nm) to about 50 microns, from about 500 nanometers to about 30 microns, from about 1 micron to about 20 microns, and from about 5 microns to about 20 microns). An increased nickel particle dimension (e.g., a length and/or a diameter) may increase inter-flake contact, facilitating improved conductivity of the nickel film. In some embodiments, a nickel ink can include nickel particles having a size which allows increased inter-particle contact for improved nickel ink conductivity. In some embodiments, nickel particles of a nickel ink can have a size enabling increased inter-particle contact, while facilitating printing of the nickel ink and/or dispersion of the nickel flakes in the nickel ink.

Carbon Additive

In some embodiments, carbon particles can be of any shape. For example, carbon can comprise flakes, nano/microwires, spheres, a random particles shape, combinations thereof, and the like. Carbon particles can be of all printable sizes (e.g., a length and/or a diameter from about 100 nm to about 50 microns). For example, carbon particles may have a diameter of about 5 microns.

The carbon additive may be of any origin, including, for example, graphene, graphite, activated carbon, carbon nanotubes, carbon nanofibers, combinations thereof, and the like. In some embodiments, graphene flakes are commercially available (e.g., from XG Sciences, Inc., of Lansing, Mich.). In some embodiments, graphite is commercially available (e.g., from IMCAL Ltd., of Westlake, Ohio). Other carbon additives may also be commercially available (e.g., carbon nanotubes from SouthWest Nanotechnologies Inc., of Norman, Okla., and carbon nanofibers from Pyrograf Products, Inc., of Cedarville, Ohio).

Components of the Polymer (Polyester)

Polymers or polyesters may be molten or dissolved polyesters (e.g., polymers which contain the ester functional group in their main chain). A polyester may be made from a combination of acids and alcohols (e.g., via polycondensation). Example acids can include: dicarboxylic acids such as propanedioic (malonic) acid, butanedioic (succinic) acid, pentanedioic (glutaric) acid, hexanedioic (adipic) acid, heptanedioic (pimelic) acid, octanedioic (suberic) acid, nonanedioic (azelaic) acid, decanedioic (sebacic) acid, undecanedioic acid, dodecanedioic acid, tridecanedioic (brassylic) acid, tetradecanedioic acid, pentadecanedioic acid, hexadecanedioic (thapsic) acid, octadecanedioic acid; tricarboxylic acids, such as citric acid, isocitric acid, aconitic acid, carballylic acid, trimesic acid, terephthalic acid; the like, and mixtures thereof.

Example alcohols can include: polyols (or liquid polyols), glycerols and glycols such as glycerin, diol, triol, tetraol, pentaol, ethylene glycols, diethylene glycols, polyethylene glycols, propylene glycols, dipropylene glycols, glycol ethers, glycol ether acetates 1,4-butanediol, 1,2-butanediol, 2,3-butanediol, 1,3-propanediol, 1,4-butanediol, 1,5-pentanediol, 1,8-octanediol, 1,2-propanediol, 1,3-butanediol, 1,2-pentanediol, etohexadiol, p-menthane-3,8-diol, 2-methyl-2,4-pentanediol, combinations thereof, and the like.

A polyester may be made from hydroxicarboxilic acids (e.g., via polycondensation): 4-hydroxybenzoic acid, glycolic acid, lactic acid, citric acid, mandelic acid, beta hydroxy acid, omega hydroxy acid, salicylic acid, 3-hydroxypropionic acid, 6-hydroxynaphthalene-2-carboxylic acid, combinations thereof, and the like.

Additives

Additives to inks can have several functions. For example, additives may be a viscosity modifier, wetting agents, flow and leveling agents, and adhesion promoters, and/or corrosion inhibitors. In some embodiments, solvents can act as viscosity modifiers and wetting agents, flow and leveling agents, and adhesion promoters.

Example solvents include: water, alcohols such as methanol, ethanol, N-propanol (including 1-propanol, 2-propanol (isopropanol or IPA), 1-methoxy-2-propanol), butanol (including 1-butanol, 2-butanol (isobutanol)), pentanol (including 1-pentanol, 2-pentanol, 3-pentanol), hexanol (including 1-hexanol, 2-hexanol, 3-hexanol), octanol, N-octanol (including 1-octanol, 2-octanol, 3-octanol), tetrahydrofurfuryl alcohol (THFA), cyclohexanol, cyclopentanol, terpineol; butyl lactone; ethers such as methyl ethyl ether, diethyl ether, ethyl propyl ether, and polyethers; ketones, including diketones and cyclic ketones, such as cyclohexanone, cyclopentanone, cycloheptanone, cyclooctanone, acetone, benzophenone, acetylacetone, acetophenone, cyclopropanone, isophorone, methyl ethyl ketone; esters such ethyl acetate, dimethyl adipate, proplyene glycol monomethyl ether acetate, dimethyl glutarate, dimethyl succinate, glycerin acetate, carboxylates; carbonates such as propylene carbonate; glycol ethers, glycol ether acetates, tetramethyl urea, n-methylpyrrolidone, acetonitrile, tetrahydrofuran (THF), dimethyl formamide (DMF), N-methyl formamide (NMF), dimethyl sulfoxide (DMSO); thionyl chloride; sulfuryl chloride, 1,2-diaminoethane, propane-1,3-diamine, butane-1,4-diamine, pentane-1,5-diamine, hexane-1,6-diamine, 1,2-diaminopropane, diphenylethylenediamine, diaminocyclohexane, o-xylylenediamine, o-phenylenediamine, m-phenylenediamine, hexane, decane, tetradecane, combinations thereof, and the like.

In some embodiments, corrosion inhibitors can include N,N-Diethylhydroxylamine, ascorbic acid, hydrazine, hexamine, phenylenediamine, benzotriazole, zinc dithiophosphate, tannic acid, zinc phosphate, hexafluoroacetylacetone, combinations thereof, and the like.

EXAMPLE EMBODIMENTS

The following example embodiments identify some possible permutations of combinations of features disclosed herein, although other permutations of combinations of features are also possible.

1. A conductive ink comprising:
a nickel component;
a polycarboxylic acid component; and a polyol component, the polycarboxylic acid component and the polyol component being reactable to form a polyester component.

2. The conductive ink of embodiment 1, further comprising an additive component.

3. The conductive ink of embodiment 1 or 2, further comprising a carbon component.

4. The conductive ink of any one of embodiments 1 to 3, wherein the nickel component comprises at least one of nickel flakes, nickel nano/microwires, and nickel spheres.

5. The conductive ink of embodiment 4, wherein the nickel flakes comprise a thickness of less than about 5 microns.

6. The conductive ink of embodiment 4 or 5, wherein the nickel flakes comprise a diameter of about 500 nanometers to about 30 microns.

7. The conductive ink of any one of embodiments 1 to 6, wherein the nickel component comprises a filamentary nickel powder.

8. The conductive ink of embodiment 7, wherein the filamentary nickel powder comprises a longest dimension in a range of about 2 microns to about 10 microns.

9. The conductive ink of any one of embodiments 1 to 8, wherein the nickel component comprises at least one particle having a longest dimension in a range of about 100 nanometers to about 50 microns.

10. The conductive ink of any one of embodiments 1 to 8, wherein the nickel component comprises at least one particle having a longest dimension in a range of about 5 microns to about 20 microns.

11. The conductive ink of any one of embodiments 3 to 10, wherein the carbon component comprises at least one of carbon flakes, carbon nano/microwires, and carbon spheres.

12. The conductive ink of any one of embodiments 3 to 11, wherein the carbon component comprises at least one of graphene, graphite, activated carbon, carbon nanotubes, and carbon nanofibers.

13. The conductive ink of embodiment 12, wherein the graphene comprises graphene flakes.

14. The conductive ink of embodiment 13, wherein at least one of the graphene flakes comprises a diameter of about 5 microns.

15. The conductive ink of embodiment 13 or 14, wherein at least one of the graphene flakes comprises a diameter of about 100 nanometers to about 50 microns.

16. The conductive ink of any one of embodiments 12 to 15, wherein the graphite comprises a graphite powder.

17. The conductive ink of any one of embodiments 1 to 16, wherein the polycarboxylic acid component comprises a dicarboxylic acid.

18. The conductive ink of embodiment 17, wherein the dicarboxylic acid comprises at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, and an octadecanedioic acid.

19. The conductive ink of any one of embodiments 1 to 18, wherein the polycarboxylic acid component comprises a tricarboxylic acid.

20. The conductive ink of embodiment 19, wherein the tricarboxylic comprises at least one of a citric acid, an isocitric acid, an aconitic acid, a carballylic acid, a trimesic acid, and a terephthalic acid.

21. The conductive ink of any one of embodiments 1 to 20, wherein the polycarboxylic acid component comprises a hydroxicarboxilic acid.

22. The conductive ink of embodiment 21, wherein the hydroxicarboxilic acid comprises at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

23. The conductive ink of embodiment 22, wherein the polyol component comprises at least one of a glycerol and a glycol.

24. The conductive ink of embodiment 22 or 23, wherein the polyol component comprises at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

25. The conductive ink of any one of embodiments 2 to 24, wherein the additive component comprises at least one of a viscosity modifier, a wetting agent, a flow and leveling agent, an adhesion promoter, and a corrosion inhibitor.

26. The conductive ink of embodiment 25, wherein the wetting agent comprises a polyethylene glycol.

27. The conductive ink of embodiment 25 or 26, wherein the corrosion inhibitor comprises at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

28. The conductive ink of any one of embodiments 2 to 27, wherein the additive component comprises a solvent.

29. The conductive ink of embodiment 28, wherein the solvent comprises at least one of a viscosity modifier, a wetting agent, a flow and leveling agent, and an adhesion promoter.

30. The conductive ink of embodiment 28 or 29, wherein the solvent comprises at least one of an alcohol and water.

31. The conductive ink of embodiment 30, wherein the alcohol comprises at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol.

32. The conductive ink of embodiment 31, wherein the N-propanol comprises at least one of a 1-propanol, a 2-propanol, and a 1-methoxy-2-propanol.

33. The conductive ink of embodiment 31, wherein the butanol comprises at least one of a 1-butanol and a 2-butanol.

34. The conductive ink of embodiment 31, wherein the pentanol comprises at least one of a 1-pentanol, a 2-pentanol, and a 3-pentanol.

35. The conductive ink of embodiment 31, wherein the hexanol comprises at least one of a 1-hexanol, a 2-hexanol, and a 3-hexanol.

36. The conductive ink of embodiment 31, wherein the N-octanol comprises at least one of a 1-octanol, a 2-octanol, and a 3-octanol.

37. The conductive ink of any one of embodiments 2 to 36, wherein the additive component comprises a butyl lactone.

38. The conductive ink of any one of embodiments 2 to 37, wherein the additive component comprises an ether.

39. The conductive ink of embodiment 38, wherein the ether comprises at least one of a methyl ethyl ether, a diethyl ether, an ethyl propyl ether, and a polyether.

40. The conductive ink of any one of embodiments 2 to 39, wherein the additive component comprises a ketone.

41. The conductive ink of embodiment 40, wherein the ketone comprises at least one of an acetone and a methyl ethyl ketone.

42. The conductive ink of embodiment 40 or 41, wherein the ketone comprises at least one of a diketone and a cyclic ketone.

43. The conductive ink of embodiment 42, wherein the cyclic ketone comprises at least one of a cyclohexanone, a cyclopentanone, a cycloheptanone, a cyclooctanone, a benzophenone, an acetylacetone, an acetophenone, a cyclopropanone, and an isophorone.

44. The conductive ink of any one of embodiments 2 to 43, wherein the additive component comprises an ester.

45. The conductive ink of embodiment 44, wherein the ester comprises at least one of an ethyl acetate, a dimethyl adipate, a proplyene glycol monomethyl ether acetate, a dimethyl glutarate, a dimethyl succinate, a glycerin acetate, and a carboxylate.

46. The conductive ink of any one of embodiments 2 to 45, wherein the additive component comprises a carbonate.

47. The conductive ink of embodiment 46, wherein the carbonate comprises a propylene carbonate.

48. The conductive ink of any one of embodiments 2 to 47, wherein the additive component comprises at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, and a teradecane. 142. The method of any one of embodiments 88 to 141, wherein the additive component comprises at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, and a tetradecane.

49. The conductive ink of any one of embodiments 1 to 48, wherein the conductive ink has a viscosity at about 25° C. in a range from about 5,000 centipoise to about 11,000 centipoise.

50. The conductive ink of any one of embodiments 1 to 49, wherein the nickel component is in a range from about 50 wt % to about 60 wt %.

51. The conductive ink of any one of embodiments 1 to 49, wherein the nickel component is in a range from about 35 wt % to about 65 wt %.

52. The conductive ink of any one of embodiments 3 to 51, wherein the carbon component is in a range from about 0.5 wt % to about 2.5 wt %.

53. The conductive ink of any one of embodiments 3 to 51, wherein the carbon component is less than about 10 wt %.

54. The conductive ink of any of embodiments 1 to 53, wherein the polycarboxylic acid component is in a range from about 5 wt % to about 15 wt %.

55. The conductive ink of any of embodiments 1 to 54, wherein the polyol component is in a range from about 25 wt % to about 40 wt %.

56. The conductive ink of any of embodiments 1 to 54, wherein the polyol component is in a range from about 15 wt % to about 60 wt %.

57. The conductive ink of any of embodiments 2 to 56, wherein the additive component is less than about 10%.

58. A conductive film comprising:
a nickel component; and
a polyester component.

59. The conductive film of embodiment 58, further comprising an additive component.

60. The conductive film of embodiment 58 or 59, further comprising a carbon component.

61. The conductive film of any one of embodiments 58 to 60, wherein the nickel component comprises at least one of nickel flakes, nickel nano/microwires, and nickel spheres.

62. The conductive film of embodiment 61, wherein the nickel flakes comprise a thickness of less than about 5 microns.

63. The conductive film of embodiment 61 or 62, wherein the nickel flakes comprise a diameter of about 500 nanometers to about 30 microns.

64. The conductive film of any one of embodiments 58 to 63, wherein the nickel component comprises a filamentary nickel powder.

65. The conductive film of embodiment 64, wherein the filamentary nickel powder comprises a longest dimension in a range of about 2 microns to about 10 microns.

66. The conductive film of any one of embodiments 58 to 65, wherein the nickel component comprises at least one particle having a longest dimension in a range of about 100 nanometers to about 50 microns.

67. The conductive film of any one of embodiments 58 to 65, wherein the nickel component comprises at least one particle having a longest dimension in a range of about 5 microns to about 20 microns.

68. The conductive film of any one of embodiments 60 to 67, wherein the carbon component comprises at least one of carbon flakes, carbon nano/microwires, and carbon spheres.

69. The conductive film of any one of embodiments 60 to 68, wherein the carbon component comprises at least one of graphene, graphite, activated carbon, carbon nanotubes, and carbon nanofibers.

70. The conductive film of embodiment 69, wherein the graphene comprises graphene flakes.

71. The conductive film of embodiment 70, wherein at least one of the graphene flakes comprises a diameter of about 5 microns.

72. The conductive film of any one of embodiments 70 or 71, wherein at least one of the graphene flakes comprises a diameter of about 100 nanometers to about 50 microns.

73. The conductive film of any one of embodiments 69 to 72, wherein the graphite comprises a graphite powder.

74. The conductive film of any one of embodiments 58 to 73, wherein the polyester component is formed in situ from a polycarboxylic acid component and a polyol component.

75. The conductive film of any one of embodiments 58 to 74, wherein the conductive film has a sheet resistance in a range from about 0.5 ohm/sq/mil to about 1.5 ohm/sq/mil.

76. The conductive film of any one of embodiments 58 to 75, wherein the conductive film has a thickness in a range from about 4 microns to about 40 microns.

77. The conductive film of any one of embodiments 58 to 76, wherein the conductive film can be printed onto a substrate.

78. The conductive film of embodiment 77, wherein the substrate comprises a conductive substrate or a non-conductive substrate.

79. The conductive film of embodiment 77 or 78, wherein the substrate comprises at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.

80. A method of fabricating a conductive ink, the method comprising:
dispersing a nickel component in a solvent component; and
dispersing a polyester component in the solvent component.

81. The method of embodiment 80, further comprising dispersing a carbon component in the solvent component.

82. The method of embodiment 80 or 81, wherein dispersing the nickel component in the solvent component is before dispersing the polyester component in the solvent component.

83. The method of any one of embodiments 80 to 82, wherein dispersing the nickel component in the solvent component is after dispersing the polyester component in the solvent component.

84. The method of any one of embodiments 80 to 83, wherein dispersing the nickel component in the solvent component is before dispersing the carbon component in the solvent component.

85. The method of any one of embodiments 80 to 83, wherein dispersing the nickel component in the solvent component is after dispersing the carbon component in the solvent component.

86. The method of any one of embodiments 80 to 85, wherein dispersing the carbon component in the solvent component is before dispersing the polyester component in the solvent component.

87. The method of any one of embodiments 80 to 85, wherein dispersing the carbon component in the solvent component is after dispersing the polyester component in the solvent component.

88. The method of any one of embodiments 80 to 87, further comprising adding an additive component to the solvent component.

89. The method of embodiment 88, wherein adding the additive component to the solvent component is before dispersing the nickel component in the solvent.

90. The method of embodiment 88, wherein adding the additive component to the solvent component is after dispersing the nickel component in the solvent.

91. The method of any one of embodiments 88 to 90, wherein adding the additive component to the solvent component is before dispersing the polyester component in the solvent.

92. The method of any one of embodiments 88 to 90, wherein adding the additive component to the solvent component is after dispersing the polyester component in the solvent.

93. The method of any one of embodiments 88 to 92, wherein adding the additive component to the solvent component is before dispersing the carbon component in the solvent.

94. The method of any one of embodiments 88 to 92, wherein adding the additive component to the solvent component is after dispersing the carbon component in the solvent.

95. The method of any one of embodiments 80 to 94, wherein the conductive ink is printable onto a substrate.

96. The method of embodiment 95, wherein the substrate comprises a conductive substrate or a non-conductive substrate.

97. The method of embodiment 95 or 96, wherein the substrate comprises at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.

98. The method of any one of embodiments 80 to 97, wherein the nickel component comprises at least one of nickel flakes, nickel nano/microwires, and nickel spheres.

99. The method of embodiment 98, wherein the nickel flakes comprise a thickness of less than about 5 microns.

100. The method of embodiment 98 or 99, wherein the nickel flakes comprise a diameter of about 500 nanometers to about 30 microns.

101. The method of any one of embodiments 80 to 100, wherein the nickel component comprises a filamentary nickel powder.

102. The method of embodiment 101, wherein the filamentary nickel powder comprises a longest dimension in a range of about 2 microns to about 10 microns.

103. The method of any one of embodiments 80 to 102, wherein the nickel component comprises at least one particle having a longest dimension in a range of about 100 nanometers to about 50 microns.

104. The method of any one of embodiments 81 to 103, wherein the carbon component comprises at least one of carbon flakes, carbon nano/microwires, and carbon spheres.

105. The method of any one of embodiments 81 to 104, wherein the carbon component comprises at least one of graphene, graphite, activated carbon, carbon nanotubes, and carbon nanofibers.

106. The method of embodiment 105, wherein the graphene comprises graphene flakes.

107. The method of embodiment 106, wherein at least one of the graphene flakes comprises a diameter of about 5 microns.

108. The method of embodiment 105 or 106, wherein at least one of the graphene flakes comprises a diameter of about 100 nanometers to about 50 microns.

109. The method of any one of embodiments 105 to 108, wherein the graphite comprises a graphite powder.

110. The method of any one of embodiments 80 to 109, wherein the polyester component is formed from a polycarboxylic acid component and a polyol component.

111. The method of embodiment 110, wherein the polycarboxylic acid component comprises a dicarboxylic acid.

112. The method of embodiment 111, wherein the dicarboxylic acid comprises at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, and an octadecanedioic acid.

113. The method of any one of embodiments 110 to 112, wherein the polycarboxylic acid component comprises a tricarboxylic acid.

114. The method of embodiment 113, wherein the tricarboxylic comprises at least one of a citric acid, an isocitric acid, an aconitic acid, a carballylic acid, a trimesic acid, and a terephthalic acid.

115. The method of any one of embodiments 110 to 114, wherein the polycarboxylic acid component comprises a hydroxicarboxilic acid.

116. The method of embodiment 115, wherein the hydroxicarboxilic acid comprises at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

117. The method of any one of embodiments 110 to 116, wherein the polyol component comprises at least one of a glycerol and a glycol.

118. The method of embodiment 110 to 117, wherein the polyol component comprises at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

119. The method of any one of embodiments 88 to 118, wherein the additive component comprises at least one of a viscosity modifier, a wetting agent, a flow and leveling agent, an adhesion promoter, and a corrosion inhibitor.

120. The method of embodiment 119, wherein the wetting agent comprises a polyethylene glycol.

121. The method of embodiment 119 or 120, wherein the corrosion inhibitor comprises at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

122. The method of any one of embodiments 88 to 121, wherein the additive component comprises a solvent.

123. The method of embodiment 122, wherein the solvent comprises at least one of a viscosity modifier, a wetting agent, a flow and leveling agent and an adhesion promoter.

124. The method of any one of embodiment 122 or 123, wherein the solvent comprises at least one of an alcohol and water.

125. The method of embodiment 124, wherein the alcohol comprises at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol.

126. The method of embodiment 125, wherein the N-propanol comprises at least one of a 1-propanol, a 2-propanol, and a 1-methoxy-2-propanol.

127. The method of embodiment 125, wherein the butanol comprises at least one of a 1-butanol and a 2-butanol.

128. The method of embodiment 125, wherein the pentanol comprises at least one of a 1-pentanol, a 2-pentanol, and a 3-pentanol.

129. The method of embodiment 125, wherein the hexanol comprises at least one of a 1-hexanol, a 2-hexanol, and a 3-hexanol.

130. The method of embodiment 125, wherein the N-octanol comprises at least one of a 1-octanol, a 2-octanol, and a 3-octanol.

131. The method of any one of embodiments 88 to 130, wherein the additive component comprises a butyl lactone.

132. The method of any one of embodiments 88 to 131, wherein the additive component comprises an ether.

133. The method of embodiment 132, wherein the ether comprises at least one of a methyl ethyl ether, a diethyl ether, an ethyl propyl ether, and a polyether.

134. The method of any one of embodiments 88 to 133, wherein the additive component comprises a ketone.

135. The method of embodiment 134, wherein the ketone comprises at least one of an acetone and a methyl ethyl ketone.

136. The method of embodiments 134 or 135, wherein the ketone comprises at least one of a diketone and a cyclic ketone.

137. The method of embodiment 136, wherein the cyclic ketone comprises at least one of a cyclohexanone, a cyclopentanone, a cycloheptanone, a cyclooctanone, a benzophenone, an acetylacetone, an acetophenone, a cyclopropanone, and an isophorone.

138. The method of any one of embodiments 88 to 137, wherein the additive component comprises an ester.

139. The method of embodiment 138, wherein the ester comprises at least one of an ethyl acetate, a dimethyl adipate, a proplyene glycol monomethyl ether acetate, a dimethyl glutarate, a dimethyl succinate, a glycerin acetate, and a carboxylate.

140. The method of any one of embodiments 88 to 139, wherein the additive component comprises a carbonate.

141. The method of embodiment 140, wherein the carbonate comprises a propylene carbonate.

142. The method of any one of embodiments 88 to 141, wherein the additive component comprises at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, and a teradecane.

143. The method of any one of embodiments 80 to 142, wherein the conductive ink has a viscosity at about 25° C. in a range from about 5,000 centipoise to about 11,000 centipoise.

144. The method of any one of embodiments 80 to 143, wherein the nickel component is in a range from about 50 wt % to about 60 wt %.

145. The method of any one of embodiments 80 to 143, wherein the nickel component is in a range from about 35 wt % to about 65 wt %.

146. The method of any one of embodiments 81 to 145, wherein the carbon component is in a range from about 0.5 wt % to about 2.5 wt %.

147. The method of any one of embodiments 81 to 145, wherein the carbon component is less than about 10 wt %.

148. The method of any of embodiments 88 to 147, wherein the additive component is less than about 10 wt %.

149. A method of fabricating a conductive film, the method comprising:
printing a conductive ink on a substrate, the conductive ink comprising:

a nickel component, and
a polyester component; and
curing the printed conductive ink.

150. The method of embodiment 149, wherein printing comprises at least one of a screen printing process, a coating process, a rolling process, a spraying process, a layering process, a spin coating process, a lamination process, an affixing process, an inkjet printing process, an electro-optical printing process, an electroink printing process, a resist printing process, a thermal printing process, a laser jet printing process, a magnetic printing process, a pad printing process, a flexographic printing process, a hybrid offset lithography process, a intaglio printing process, and a die slot deposition process.

151. The method of embodiment 150, wherein the screen printing process comprises using a polyester screen.

152. The method of embodiment 150 or 151, wherein the screen printing process comprises using a polyamide screen.

153. The method of any one of embodiments 150 to 152, wherein the screen printing process comprises using a screen having a mesh size of about 110.

154. The method of any one of embodiments 150 to 153, wherein the screen printing process comprises using a screen having a mesh size of about 135.

155. The method of any one of embodiments 149 to 154, wherein the substrate comprises a conductive substrate or a non-conductive substrate.

156. The method of any one of embodiments 149 to 155, wherein the substrate comprises at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.

157. The method of any one of embodiments 149 to 156, wherein curing the printed conductive ink comprises heating the printed conductive ink and the substrate to a temperature in a range from about 100° C. to about 200° C.

158. The method of any one of embodiments 149 to 156, wherein curing the printed conductive ink comprises heating the printed conductive ink and the substrate to a temperature in a range from about 130° C. to about 140° C.

159. The method of any one of embodiments 149 to 158, wherein curing the printed conductive ink comprises heating the printed conductive ink and the substrate for a duration from about 20 seconds to about 1 hour.

160. The method of any one of embodiments 149 to 158, wherein curing the printed conductive ink comprises heating the printed conductive ink and the substrate for a duration from about 3 minutes to about 10 minutes.

161. The method of any one of embodiments 149 to 160, wherein the nickel component comprises at least one of nickel flakes, nickel nano/microwires, and nickel spheres.

162. The method of embodiment 161, wherein the nickel flakes comprise a thickness of less than about 5 microns.

163. The method of embodiment 161 or 162, wherein the nickel flakes comprise a diameter of about 500 nanometers to about 30 microns.

164. The method of any one of embodiments 149 to 163, wherein the nickel component comprises a filamentary nickel powder.

165. The method of embodiment 164, wherein the filamentary nickel powder comprises a longest dimension in a range of about 2 microns to about 10 microns.

166. The method of any one of embodiments 149 to 165, wherein the nickel component comprises at least one particle having a longest dimension in a range of about 100 nanometers to about 50 microns.

167. The method of any one of embodiments 149 to 166, wherein the conductive ink comprises a carbon component.

168. The method of embodiment 167, wherein the carbon component comprises at least one of carbon flakes, carbon nano/microwires, and carbon spheres.

169. The method of embodiment 167 or 168, wherein the carbon component comprises at least one of graphene, graphite, activated carbon, carbon nanotubes, and carbon nanofibers.

170. The method of embodiment 169, wherein the graphene comprises graphene flakes.

171. The method of embodiment 170, wherein at least one of the graphene flakes comprises a diameter of about 5 microns.

172. The method of embodiment 170 or 171, wherein at least one of the graphene flakes comprises a diameter of about 100 nanometers to about 50 microns.

173. The method of any one of embodiments 169 to 172, wherein the graphite comprises a graphite powder.

174. The method of any one of embodiments 149 to 173, wherein the polyester component is formed from a polycarboxylic acid component and a polyol component.

175. The method of embodiment 174, wherein the polycarboxylic acid component comprises a dicarboxylic acid.

176. The method of embodiment 175 wherein the dicarboxylic acid comprises at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, and an octadecanedioic acid.

177. The method of any one of embodiments 174 to 176, wherein the polycarboxylic acid component comprises a tricarboxylic acid.

178. The method of embodiment 177, wherein the tricarboxylic comprises at least one of a citric acid, an isocitric acid, an aconitic acid, a carballylic acid, a trimesic acid, and a terephthalic acid.

179. The method of any one of embodiments 174 to 178, wherein the polycarboxylic acid component comprises a hydroxicarboxilic acid.

180. The method of embodiment 179, wherein the hydroxicarboxilic acid comprises at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

181. The method of any one of embodiments 174 to 180, wherein the polyol component comprises at least one of a glycerol and a glycol.

182. The method of any one of embodiments 174 to 181, wherein the polyol component comprises at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

183. The method of any one of embodiments 149 to 182, wherein the conductive ink comprises an additive component.

184. The method of embodiment 183, wherein the additive component comprises at least one of a viscosity modifier, a wetting agent, a flow and leveling agent, an adhesion promoter, and a corrosion inhibitor.

185. The method of embodiment 184, wherein the wetting agent comprises a polyethylene glycol.

186. The method of embodiment 184 or 185, wherein the corrosion inhibitor comprises at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

187. The method of any one of embodiments 183 to 186, wherein the additive component comprises a solvent.

188. The method of embodiment 187, wherein the solvent comprises at least one of a viscosity modifier, a wetting agent, a flow and leveling agent and an adhesion promoter.

189. The method of embodiment 187 or 188, wherein the solvent comprises at least one of an alcohol and water.

190. The method of embodiment 189, wherein the alcohol comprises at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol.

191. The method of embodiment 190, wherein the N-propanol comprises at least one of a 1-propanol, a 2-propanol, and a 1-methoxy-2-propanol.

192. The method of embodiment 190, wherein the butanol comprises at least one of a 1-butanol and a 2-butanol.

193. The method of embodiment 190, wherein the pentanol comprises at least one of a 1-pentanol, a 2-pentanol, and a 3-pentanol.

194. The method of embodiment 190, wherein the hexanol comprises at least one of a 1-hexanol, a 2-hexanol, and a 3-hexanol.

195. The method of embodiment 190, wherein the N-octanol comprises at least one of a 1-octanol, a 2-octanol, and a 3-octanol.

196. The method of any one of embodiments 183 to 195, wherein the additive component comprises a butyl lactone.

197. The method of any one of embodiments 183 to 196, wherein the additive component comprises an ether.

198. The method of embodiment 197, wherein the ether comprises at least one of a methyl ethyl ether, a diethyl ether, an ethyl propyl ether, and a polyether.

199. The method of any one of embodiments 183 to 198, wherein the additive component comprises a ketone.

200. The method of embodiment 199, wherein the ketone comprises at least one of an acetone and a methyl ethyl ketone.

201. The method of embodiment 199 or 200, wherein the ketone comprises at least one of a diketone and a cyclic ketone.

202. The method of embodiment 201, wherein the cyclic ketone comprises at least one of a cyclohexanone, a cyclopentanone, a cycloheptanone, a cyclooctanone, a benzophenone, an acetylacetone, an acetophenone, a cyclopropanone, and an isophorone.

203. The method of any one of embodiments 183 to 202, wherein the additive component comprises an ester.

204. The method of embodiment 203, wherein the ester comprises at least one of an ethyl acetate, a dimethyl adipate, a proplyene glycol monomethyl ether acetate, a dimethyl glutarate, a dimethyl succinate, a glycerin acetate, and a carboxylate.

205. The method of any one of embodiments 183 to 204, wherein the additive component comprises a carbonate.

206. The method of embodiment 205 wherein the carbonate comprises a propylene carbonate.

207. The method of any one of embodiments 183 to 206, wherein the additive component comprises at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylenediamine, an o-phenylenediamine, an m-phenylenediamine, a hexane, a decane, and a tetradecane.

208. The method of any one of embodiments 149 to 207, wherein the conductive ink comprises a viscosity at 25° C. in a range from about 5,000 centipoise to about 11,000 centipoise.

209. The method of any one of embodiments 189 to 251, wherein the nickel component is in a range from about 50 wt % to about 60 wt %.

210. The method of any one of embodiments 189 to 251, wherein the nickel component is in a range from about 35 wt % to about 65 wt %.

211. The method of any one of embodiments 207 to 253, wherein the carbon component is in a range from about 0.5 wt % to about 2.5 wt %.

212. The method of any one of embodiments 207 to 253, wherein the carbon component is less than about 10 wt %.

213. The method of any of embodiments 226 to 258, wherein the additive component is less than about 10 wt %.

214. A method of fabricating a conductive ink, the method comprising:
dispersing a nickel component in a polyol component;
dispersing a polycarboxylic acid component in the polyol component, the polycarboxylic acid component and the polyol component being reactable to form a polyester component.

215. The method of embodiment 214, wherein dispersing the polycarboxylic acid component in the polyol component forms the polyester component in situ.

216. The method of embodiment 214 or 215, further comprising dispersing a carbon component in the polyol component.

217. The method of any one of embodiments 214 to 216, wherein dispersing the nickel component in the polyol component is before dispersing the polycarboxylic acid component in the polyol component.

218. The method of any one of embodiments 214 to 216, wherein dispersing the nickel component in the polyol component is after dispersing the polycarboxylic acid component in the polyol component.

219. The method of any one of embodiments 216 to 218, wherein dispersing the nickel component in the polyol component is before dispersing the carbon component in the polyol component.

220. The method of any one of embodiments 216 to 218, wherein dispersing the nickel component in the polyol component is after dispersing the carbon component in the polyol component.

221. The method of any one of embodiments 216 to 220, wherein dispersing the carbon component in the polyol component is before dispersing the polycarboxylic acid component in the polyol component.

222. The method of any one of embodiments 216 to 220, wherein dispersing the carbon component in the polyol component is after dispersing the polycarboxylic acid component in the polyol component.

223. The method of any one of embodiments 214 to 222, further comprising adding an additive component.

224. The method of embodiment 223, wherein adding the additive component is before dispersing the nickel component in the polyol component.

225. The method of embodiment 223, wherein adding the additive component is after dispersing the nickel component in the polyol component.

226. The method of any one of embodiments 223 to 225, wherein adding the additive component is before dispersing the polycarboxylic acid component in the polyol component.

227. The method of any one of embodiments 223 to 225, wherein adding the additive component is after dispersing the polycarboxylic acid component in the polyol component.

228. The method of any one of embodiments 223 to 227, wherein adding the additive component is before dispersing the carbon component in the polyol component.

229. The method of any one of embodiments 223 to 227, wherein adding the additive component is after dispersing the carbon component in the polyol component.

230. The method of any one of embodiments 214 to 229, wherein the conductive ink is printable onto a substrate.

231. The method of embodiment 230, wherein the substrate comprises a conductive substrate or a non-conductive substrate.

232. The method of embodiment 230 or 231, wherein the substrate comprises at least one of a graphite paper, a graphene paper, a polyester film, a polyimide film, an aluminum foil, a copper foil, a stainless steel foil, a carbon foam, a polycarbonate film, a paper, a coated paper, a plastic coated paper, a fiber paper, and a cardboard.

233. The method of any one of embodiments 214 to 232, wherein the nickel component comprises at least one of nickel flakes, nickel nano/microwires, and nickel spheres.

234. The method of embodiment 233, wherein the nickel flakes comprise a thickness of less than about 5 microns.

235. The method of embodiment 233 or 234, wherein the nickel flakes comprise a diameter of about 500 nanometers to about 30 microns.

236. The method of any one of embodiments 214 to 235, wherein the nickel component comprises a filamentary nickel powder.

237. The method of embodiment 236, wherein the filamentary nickel powder comprises a longest dimension in a range of about 2 microns to about 10 microns.

238. The method of any one of embodiments 214 to 237, wherein the nickel component comprises at least one particle having a longest dimension in a range of about 100 nanometers to about 50 microns.

239. The method of any one of embodiments 216 to 238, wherein the carbon component comprises at least one of carbon flakes, carbon nano/microwires, and carbon spheres.

240. The method of any one of embodiments 216 to 239, wherein the carbon component comprises at least one of graphene, graphite, activated carbon, carbon nanotubes, and carbon nanofibers.

241. The method of embodiment 240, wherein the graphene comprises graphene flakes.

242. The method of embodiment 241, wherein at least one of the graphene flakes comprises a diameter of about 5 microns.

243. The method of embodiment 241 or 242, wherein at least one of the graphene flakes comprises a diameter of about 100 nanometers to about 50 microns.

244. The method of any one of embodiments 240 to 243, wherein the graphite comprises a graphite powder.

245. The method of any one of embodiments 214 to 244, wherein the polycarboxylic acid component comprises a dicarboxylic acid.

246. The method of embodiment 245, wherein the dicarboxylic acid comprises at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, and an octadecanedioic acid.

247. The method of any one of embodiments 214 to 246, wherein the polycarboxylic acid component comprises a tricarboxylic acid.

248. The method of embodiment 247, wherein the tricarboxylic comprises at least one of a citric acid, an isocitric acid, an aconitic acid, a carballylic acid, a trimesic acid, and a terephthalic acid.

249. The method of any one of embodiments 214 to 248, wherein the polycarboxylic acid component comprises a hydroxicarboxilic acid.

250. The method of embodiment 249, wherein the hydroxicarboxilic acid comprises at least one of a 4-hydroxybenzoic acid, a glycolic acid, a lactic acid, citric acid, a mandelic acid, a beta hydroxy acid, an omega hydroxy acid, a salicylic acid, a 3-hydroxypropionic acid, and a 6-hydroxynaphthalene-2-carboxylic acid.

251. The method of any one of embodiments 214 to 250, wherein the polyol component comprises at least one of a glycerol and a glycol.

252. The method of any one of embodiments 214 or 251, wherein the polyol component comprises at least one of a glycerin, a diol, a triol, a tetraol, a pentaol, an ethylene glycol, a diethylene glycol, a polyethylene glycol, a propylene glycol, a dipropylene glycol, a glycol ether, a glycol ether acetates 1,4-butanediol, a 1,2-butanediol, a 2,3-butanediol, a 1,3-propanediol, a 1,4-butanediol, a 1,5-pentanediol, a 1,8-octanediol, a 1,2-propanediol, a 1,3-butanediol, a 1,2-pentanediol, an etohexadiol, a p-menthane-3,8-diol, and a 2-methyl-2,4-pentanediol.

253. The method of any one of embodiments 223 to 252, wherein the additive component comprises at least one of a viscosity modifier, a wetting agent, a flow and leveling agent, an adhesion promoter, and a corrosion inhibitor.

254. The method of embodiment 253, wherein the wetting agent comprises a polyethylene glycol.

255. The method of embodiment 253 or 254, wherein the corrosion inhibitor comprises at least one of an N,N-diethylhydroxylamine, an ascorbic acid, a hydrazine, a hexamine, a phenylenediamine, a benzotriazole, a zinc dithiophosphate, a tannic acid, a zinc phosphate, and a hexafluoroacetylacetone.

256. The method of any one of embodiments 223 to 255, wherein the additive component comprises a solvent.

257. The method of embodiment 256, wherein the solvent comprises at least one of a viscosity modifier, a wetting agent, a flow and leveling agent and an adhesion promoter.

258. The method of any one of embodiment 256 or 257, wherein the solvent comprises at least one of an alcohol and water.

259. The method of embodiment 258, wherein the alcohol comprises at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol.

260. The method of embodiment 259, wherein the N-propanol comprises at least one of a 1-propanol, a 2-propanol, and a 1-methoxy-2-propanol.

261. The method of embodiment 259, wherein the butanol comprises at least one of a 1-butanol and a 2-butanol.

262. The method of embodiment 259, wherein the pentanol comprises at least one of a 1-pentanol, a 2-pentanol, and a 3-pentanol.

263. The method of embodiment 259, wherein the hexanol comprises at least one of a 1-hexanol, a 2-hexanol, and a 3-hexanol.

264. The method of embodiment 259, wherein the N-octanol comprises at least one of a 1-octanol, a 2-octanol, and a 3-octanol.

265. The method of any one of embodiments 223 to 264, wherein the additive component comprises a butyl lactone.

266. The method of any one of embodiments 223 to 265, wherein the additive component comprises an ether.

267. The method of embodiment 266, wherein the ether comprises at least one of a methyl ethyl ether, a diethyl ether, an ethyl propyl ether, and a polyether.

268. The method of any one of embodiments 223 to 267, wherein the additive component comprises a ketone.

269. The method of embodiment 268, wherein the ketone comprises at least one of an acetone and a methyl ethyl ketone.

270. The method of embodiments 268 or 269, wherein the ketone comprises at least one of a diketone and a cyclic ketone.

271. The method of embodiment 270, wherein the cyclic ketone comprises at least one of a cyclohexanone, a cyclopentanone, a cycloheptanone, a cyclooctanone, a benzophenone, an acetylacetone, an acetophenone, a cyclopropanone, and an isophorone.

272. The method of any one of embodiments 223 to 271, wherein the additive component comprises an ester.

273. The method of embodiment 272, wherein the ester comprises at least one of an ethyl acetate, a dimethyl adipate, a proplyene glycol monomethyl ether acetate, a dimethyl glutarate, a dimethyl succinate, a glycerin acetate, and a carboxylate.

274. The method of any one of embodiments 223 to 273, wherein the additive component comprises a carbonate.

275. The method of embodiment 274, wherein the carbonate comprises a propylene carbonate.

276. The method of any one of embodiments 223 to 275, wherein the additive component comprises at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, and a tetradecane.

277. The method of any one of embodiments 214 to 276, wherein the conductive ink has a viscosity at about 25° C. in a range from about 5,000 centipoise to about 11,000 centipoise.

278. The method of any one of embodiments 214 to 277, wherein the nickel component is in a range from about 50 wt % to about 60 wt %.

279. The method of any one of embodiments 214 to 277, wherein the nickel component is in a range from about 35 wt % to about 65 wt %.

280. The method of any one of embodiments 216 to 279, wherein the carbon component is in a range from about 0.5 wt % to about 2.5 wt %.

281. The method of any one of embodiments 216 to 279, wherein the carbon component is less than about 10 wt %.

282. The method of any of embodiments 214 to 281, wherein the polycarboxylic acid component is in a range from about 5 wt % to about 15 wt %.

283. The method of any of embodiments 214 to 282, wherein the polyol component is in a range from about 25 wt % to about 40 wt %.

284. The method of any of embodiments 214 to 282, wherein the polyol component is in a range from about 15 wt % to about 60 wt %.

285. The method of any one of embodiments 223 to 284, wherein the additive component is less than about 10 wt %.

What is claimed is:

1. A conductive ink for producing a conductive film comprising a polyester component, the conductive ink comprising:
   a solvent;
   a conductive nickel component comprising nickel particles having a longest dimension in a range of about 0.5 µm to about 50 µm;
   a polycarboxylic acid component, wherein the polycarboxylic acid component is present in a range from 5 weight % to 15 weight % of the conductive ink; and
   a polyol component, wherein the polyol component and the polycarboxylic acid component are present in amounts sufficient to react to form a polyester component.

2. The conductive ink of claim 1, wherein the conductive nickel component comprises at least one of nickel flakes, nickel nanowires, nickel microwires, and nickel spheres.

3. The conductive ink of claim 1, wherein the conductive nickel component is in a range from 35 weight % to 65 weight %, and wherein the polyol component is in a range from 15 weight % to 60 weight %.

4. The conductive ink of claim 1, further comprising a conductive carbon component.

5. The conductive ink of claim 4, wherein the conductive carbon component comprises at least one of graphene, graphite, carbon nanotubes, and carbon nanofibers.

6. The conductive ink of claim 4, wherein the conductive carbon component comprises graphene flakes.

7. The conductive ink of claim 4, wherein the conductive carbon component is less than 10 weight %.

8. The conductive ink of claim 1, wherein the polycarboxylic acid component comprises a dicarboxylic acid.

9. The conductive ink of claim 8, wherein the dicarboxylic acid comprises at least one of a propanedioic (malonic) acid, a butanedioic (succinic) acid, a pentanedioic (glutaric) acid, a hexanedioic (adipic) acid, a heptanedioic (pimelic) acid, a octanedioic (suberic) acid, a nonanedioic (azelaic) acid, a decanedioic (sebacic) acid, an undecanedioic acid, a dodecanedioic acid, a tridecanedioic (brassylic) acid, a tetradecanedioic acid, a pentadecanedioic acid, a hexadecanedioic (thapsic) acid, and an octadecanedioic acid.

10. The conductive ink of claim 1, wherein the polyol component comprises at least one of a diol, a triol, a tetraol, and a pentaol.

11. The conductive ink of claim 1, wherein the polyol component comprises at least one of glycerin, ethylene glycol, diethylene glycol, polyethylene glycol, propylene glycol, dipropylene glycol, glycol ether, glycol ether acetates 1,4-butanediol, 1,2-butanediol, 2,3-butanediol, 1,3-propanediol, 1,4-butanediol, 1,5-pentanediol, 1,8-octanediol, 1,2-propanediol, 1,3-butanediol, 1,2-pentanediol, etohexadiol, p-menthane-3,8-diol, and 2-methyl-2,4-pentanediol.

12. The conductive ink of claim 6, wherein the graphene flakes have a diameter of 100 nanometers to 50 micron.

13. The conductive ink of claim 6, wherein the conductive nickel component comprises nickel flakes and wherein at least some of the graphene flakes are between at least some of the nickel flakes.

14. The conductive ink of claim 1, wherein the conductive nickel component comprises nickel flakes and wherein the nickel flakes have a diameter of about 500 nanometers to about 30 microns.

15. The conductive ink of claim 1, wherein the conductive ink comprises a viscosity of 5,000 centipoise (cP) to 11,000 cP at a temperature of 25° C.

16. The conductive ink of claim 1, further comprising a corrosion inhibitor.

17. The conductive ink of claim 16, wherein the corrosion inhibitor comprises at least one of N,N-diethylhydroxylamine, ascorbic acid, hydrazine, hexamine, phenylenediamine, benzotriazole, zinc dithiophosphate, tannic acid, zinc phosphate, and hexafluoroacetylacetone.

18. The conductive ink of claim 1, wherein the polycarboxylic acid component comprises a tricarboxylic acid.

19. The conductive ink of claim 1, wherein the solvent comprises at least one of a methanol, an ethanol, a N-propanol, a pentanol, a hexanol, an octanol, a cyclohexanol, a cyclopentanol, and a terpineol.

\* \* \* \* \*

UNITED STATES PATENT AND TRADEMARK OFFICE
CERTIFICATE OF CORRECTION

PATENT NO. : 10,329,444 B2
APPLICATION NO. : 14/141929
DATED : June 25, 2019
INVENTOR(S) : Lockett et al.

Page 1 of 2

It is certified that error appears in the above-identified patent and that said Letters Patent is hereby corrected as shown below:

In the Specification

In Column 2, Line 40, change "hydroxicarboxilic" to --hydroxycarboxylic--.

In Column 2, Line 41, change "hydroxicarboxilic" to --hydroxycarboxylic--.

In Column 3, Line 32, change "proplyene" to --propylene--.

In Column 6, Line 11, change "hydroxicarboxilic" to --hydroxycarboxylic--.

In Column 6, Line 12, change "hydroxicarboxilic" to --hydroxycarboxylic--.

In Column 7, Line 1, change "proplyene" to --propylene--.

In Column 8, Line 56, change "hydroxicarboxilic" to --hydroxycarboxylic--.

In Column 8, Line 57, change "hydroxicarboxilic" to --hydroxycarboxylic--.

In Column 9, Line 50, change "proplyene" to --propylene--.

In Column 11, Line 47, change "hydroxicarboxilic" to --hydroxycarboxylic--.

In Column 11, Line 48, change "hydroxicarboxilic" to --hydroxycarboxylic--.

In Column 12, Line 38, change "proplyene" to --propylene--.

In Column 18, Line 67, change "Diethylhydroxlyamine" to --Diethylhydroxylamine--.

In Column 22, Line 12 (Approx.), change "hydroxicarboxilic" to --hydroxycarboxylic--.

Signed and Sealed this
First Day of October, 2019

Andrei Iancu
*Director of the United States Patent and Trademark Office*

CERTIFICATE OF CORRECTION (continued)
U.S. Pat. No. 10,329,444 B2

In Column 22, Line 40, change "proplyene" to --propylene--.

In Column 24, Line 3, change "hydroxicarboxilic" to --hydroxycarboxylic--.

In Column 24, Line 5, change "hydroxicarboxilic" to --hydroxycarboxylic--.

In Column 25, Line 21, change "proplyene" to --propylene--.

In Column 25, Line 39, change "teradecane." to --tetradecane.--.

In Column 25, Lines 39-51, after "teradecane." delete
"142. The method of any one of embodiments 88 to 141, wherein the additive component comprises at least one of a glycol ether, a glycol ether acetate, a tetramethyl urea, an n-methylpyrrolidone, an acetonitrile, a tetrahydrofuran (THF), a dimethyl formamide (DMF), an N-methyl formamide (NMF), a dimethyl sulfoxide (DMSO), a thionyl chloride, a sulfuryl chloride, a 1,2-diaminoethane, a propane-1,3-diamine, a butane-1,4-diamine, a pentane-1,5-diamine, a hexane-1,6-diamine, a 1,2-diaminopropane, a diphenylethylenediamine, a diaminocyclohexane, an o-xylylenediamine, an o-phenylenediamine, an m-phenylenediamine, a hexane, a decane, and a tetradecane.".

In Column 29, Line 11 (Approx.), change "hydroxicarboxilic" to --hydroxycarboxylic--.

In Column 29, Line 13, change "hydroxicarboxilic" to --hydroxycarboxylic--.

In Column 30, Line 28, change "proplyene" to --propylene--.

In Column 30, Line 46, change "teradecane." to --tetradecane.--.

In Column 32, Line 45, change "hydroxicarboxilic" to --hydroxycarboxylic--.

In Column 32, Line 47, change "hydroxicarboxilic" to --hydroxycarboxylic--.

In Column 33, Line 63, change "proplyene" to --propylene--.

In Column 36, Line 25, change "hydroxicarboxilic" to --hydroxycarboxylic--.

In Column 36, Line 27, change "hydroxicarboxilic" to --hydroxycarboxylic--.

In Column 37, Line 42, change "proplyene" to --propylene--.